US008428209B2

(12) United States Patent
Qi et al.

(10) Patent No.: US 8,428,209 B2
(45) Date of Patent: Apr. 23, 2013

(54) SYSTEM, APPARATUS, AND METHOD OF FREQUENCY OFFSET ESTIMATION AND CORRECTION FOR MOBILE REMOTES IN A COMMUNICATION NETWORK

(75) Inventors: Ronggang Qi, Ashburn, VA (US); Sadaf Fardeen, Centreville, VA (US); Shan Sivagnanavelu, Bristow, VA (US)

(73) Assignee: VT iDirect, Inc., Herndon, VA (US)

( * ) Notice: Subject to any disclaimer, the term of this patent is extended or adjusted under 35 U.S.C. 154(b) by 262 days.

(21) Appl. No.: 13/038,198

(22) Filed: Mar. 1, 2011

(65) Prior Publication Data

US 2011/0216865 A1 Sep. 8, 2011

Related U.S. Application Data

(60) Provisional application No. 61/309,708, filed on Mar. 2, 2010.

(51) Int. Cl.
*H04L 7/00* (2006.01)

(52) U.S. Cl.
USPC ............ 375/366; 375/362; 375/365; 375/354

(58) Field of Classification Search .................... 375/366
See application file for complete search history.

(56) References Cited

U.S. PATENT DOCUMENTS

| | | | | |
|---|---|---|---|---|
| 7,013,269 B1 * | 3/2006 | Bhaskar et al. | ............... | 704/219 |
| 2008/0031463 A1 * | 2/2008 | Davis | .............................. | 381/17 |
| 2012/0296641 A1 * | 11/2012 | Rajendran et al. | ............ | 704/206 |

* cited by examiner

*Primary Examiner* — Erin File
(74) *Attorney, Agent, or Firm* — Oblon, Spivak, McClelland, Maier & Neustadt, L.L.P.

(57) ABSTRACT

A frequency offset estimation and correction apparatus including a frame averaging unit to average a plurality of frequency offset values to obtain a frame offset average for each of a plurality of frames, a re-sampling unit to produce a plurality of interpolated frequency offset values uniformly distributed over a time period of a frame of the plurality of frames based on the frame offset average of the frame and a frame offset average of at least one frame that precedes the frame, and an exponential averaging unit to calculate the estimated frequency offset based on the plurality of interpolated frequency offset values weighted by an exponential averaging coefficient.

22 Claims, 32 Drawing Sheets

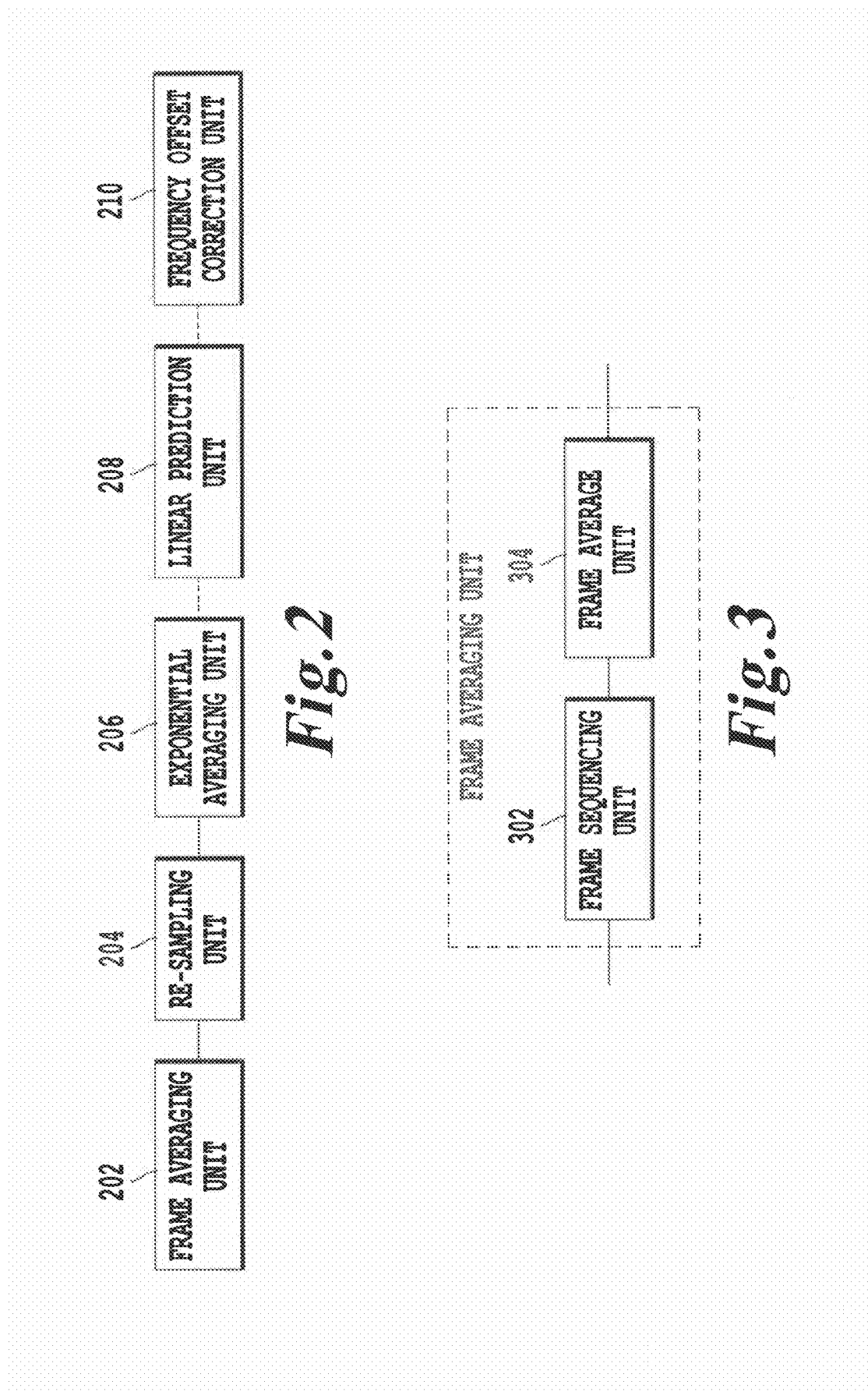

SYSTEM, APPARATUS, AND METHOD OF FREQUENCY OFFSET ESTIMATION AND CORRECTION FOR MOBILE REMOTES IN A COMMUNICATION NETWORK

CROSS-REFERENCE TO RELATED APPLICATIONS

This invention claims the benefit of U.S. Provisional Application No. 61/309,708, filed Mar. 2, 2010, the entire contents of which is incorporated herein by reference.

BACKGROUND OF THE INVENTION

1. Field of the Invention

This invention relates in general to communication networks and, in particular, to a system, apparatus, and method of frequency offset estimation and correction for mobile remotes in a communication network.

2. Discussion of the Background

A significant amount of research and development has been directed to providing broadband connectivity on aircraft using satellite networks, and multiple techniques have been proposed for providing broadband connectivity over satellite networks in high speed mobile environments. One technique proposes providing broadband connectivity over a code division multiple access (CDMA) satellite network. Other techniques propose providing broadband connectivity over time division multiple access (TDMA) channels using direct sequence spread spectrum (DSSS).

Techniques for providing broadband connectivity in a high speed mobile environments may address the problem of Doppler shift of a received carrier, because Doppler shift causes frequency synchronization to deteriorate, which leads to erroneous symbol decisions, data loss, and communication link failure.

BRIEF SUMMARY OF THE INVENTION

Accordingly, an object of the present invention is to provide a frequency offset estimation and correction apparatus, method, and computer readable storage medium.

According to one aspect of the invention, there is provided a frequency offset estimation and correction apparatus including a frame averaging unit to average, for each of a plurality of frames, a plurality of frequency offset values to obtain a frame offset average for each of the plurality of frames, a re-sampling unit to produce, for each of the plurality of frames, a plurality of interpolated frequency offset values uniformly distributed over a time period of a frame of the plurality of frames based on the frame offset average of the frame and a frame offset average of at least one frame that precedes the frame, and an exponential averaging unit to calculate the estimated frequency offset based on the plurality of interpolated frequency offset values weighted by an exponential averaging coefficient.

According to another aspect of the invention, there is provided a frequency offset estimation and correction method including averaging, for each of a plurality of frames, a plurality of frequency offset values to obtain a frame offset average for each frame, producing, for each of the plurality of frames, a plurality of interpolated frequency offset values uniformly distributed over a time period of the frame based on the frame offset average of the frame and a frame offset average of at least one previous frame, and calculating the estimated frequency offset based on the plurality of interpolated frequency offset values weighted by an exponential averaging coefficient.

According to a further aspect of the invention, there is provided a computer readable storage medium storing computer readable instructions thereon that, when executed by an arithmetic processor, direct the arithmetic processor to perform a frequency offset estimation and correction method including averaging, for each of a plurality of frames, a plurality of frequency offset values to obtain a frame offset average for each frame, producing, for each of the plurality of frames, a plurality of interpolated frequency offset values uniformly distributed over a time period of the frame based on the frame offset average of the frame and a frame offset average of at least one previous frame, and calculating the estimated frequency offset based on the plurality of interpolated frequency offset values weighted by an exponential averaging coefficient.

According to a further aspect of the invention, there is provided a communications system including a communications hub including a receiver to receive a plurality of communications bursts and generate a frequency offset value for each of the bursts, to generate frequency offset values, a frame averaging unit to average, for each of a plurality of frames, a plurality of the frequency offset values to obtain a frame offset average for each of the plurality of frames, a re-sampling unit to produce, for each of the plurality of frames, a plurality of interpolated frequency offset values uniformly distributed over a time period of a frame of the plurality of frames based on the frame offset average of the frame and a frame offset average of at least one frame that precedes the frame, and an exponential averaging unit to calculate the estimated frequency offset based on the plurality of interpolated frequency offset values weighted by an exponential averaging coefficient, and a transmitter to transmit the estimated frequency offset, and a remote communications unit including a receiver to receive the estimated frequency offset and synchronize a carrier frequency source of the remote communications unit based on the received estimated frequency offset.

According to a further aspect of the invention, there is provided a remote communications unit including a receiver to receive an estimated frequency offset, and a frequency offset correction unit to synchronize a carrier frequency source and apply a predicted timing correction to bursts before transmission of the bursts based on the estimated frequency offset, the estimated frequency offset being determined according to an exponential average of a plurality of interpolated frequency offset values weighted by an exponential averaging coefficient, the plurality of interpolated frequency offset values being uniformly distributed over a time period of a frame based on frame offset averages of frequency offset values of the frames.

According to a further aspect of the invention, there is provided a hub unit including a frequency offset estimation and correction apparatus including a frame averaging unit to average, for each of a plurality of frames, a plurality of frequency offset values to obtain a frame offset average for each of the plurality of frames, a re-sampling unit to produce, for each of the plurality of frames, a plurality of interpolated frequency offset values uniformly distributed over a time period of a frame of the plurality of frames based on the frame offset average of the frame and a frame offset average of at least one frame that precedes the frame, and an exponential averaging unit to calculate the estimated frequency offset based on the plurality of interpolated frequency offset values weighted by an exponential averaging coefficient.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a block diagram of a frequency offset estimation apparatus;

FIG. 3 is a block diagram of a frame averaging unit of a frequency offset estimation apparatus;

DETAILED DESCRIPTION OF THE INVENTION

Figure 1:
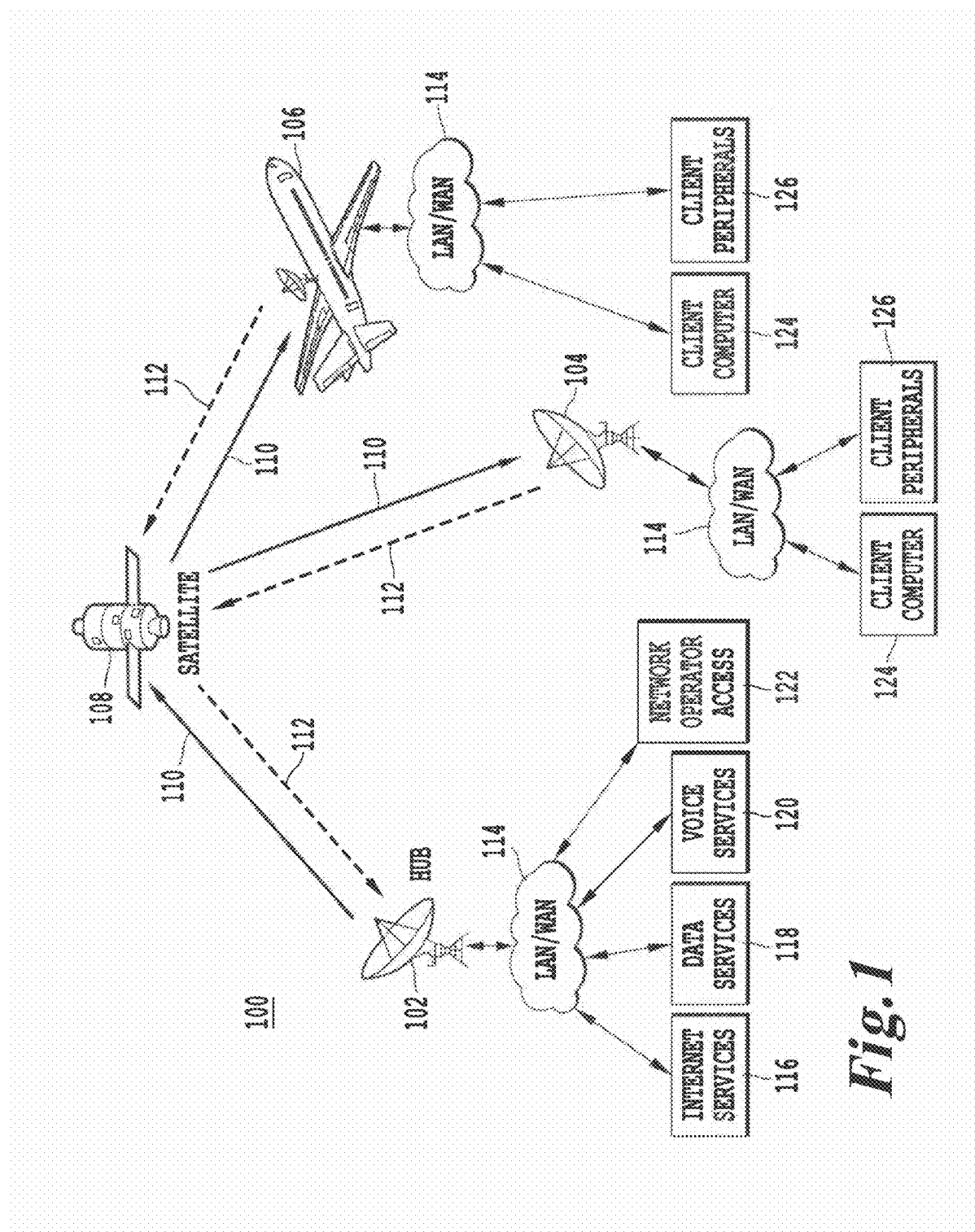
FIG. 1 illustrates a communications system.

In satellite networks such as in multi-frequency time division multiple access (MF-TDMA) satellite networks, timing and frequency shifts and drifts between a communication hub and a mobile communication remote due to Doppler shift may be accounted for and addressed. In satellite networks such as multi-frequency time division multiple access (MF-TDMA) satellite networks, a hub of the network is able to determine (i.e., estimate) frequency offset values on a burst by burst basis based on received bursts from a remote.

The Doppler shift effect causes a change in an observed frequency of an RF signal relative to a frequency at which the RF signal was transmitted. There may be a significant Doppler shift effect in a satellite network including a remote moving with respect to a satellite. For example, with regard to a remote residing in or on an aircraft moving relative to a geostationary (GEO) satellite, the Doppler shift frequency, $\Delta f$, is given by the Doppler equation:

$$\Delta f = ((v^* \cos(\theta_{EL}))/c)^* f_0, \text{ where} \quad (1)$$

v is the speed of the remote, c is the speed of light, $f_0$ is the carrier frequency transmitted by the remote, and $\theta_{EL}$ is an elevation angle with respect to an arc of the geostationary orbit (GSO) of the satellite. For a constant velocity and zero acceleration of the remote, a constant timing drift and a constant frequency shift caused by the Doppler shift effect is observed. For a changing velocity and non-zero acceleration of the remote, the observed timing drift and frequency shift changes over time. To mitigate erroneous symbol decisions, data loss, and communication link failure, the observed timing drift and frequency shift may be accounted for and addressed over time.

The velocity and acceleration experienced by a remote varies depending on the type of vehicle carrying the remote. For example, a train has elongated periods of acceleration and a relatively narrow range of velocities compared to an aircraft. Thus, a train may experience timing drift and frequency shift, but an accumulated timing drift and frequency shift is small and relatively insignificant as compared to the aircraft. In contrast, an aircraft operates over a relatively wide range of velocities and experiences great accelerations over a short period of time as compared to a train. As a result, a total timing drift and frequency shift may be more significant.

Assuming a GEO satellite having a small elevation angle (i.e., $\theta_{EL}$ is small), doppler rate can be approximated by v/c, where v is the velocity of a moving remote and c is the speed of light. Taking an airplane as an example, where the velocity of the airplane is 1188 Km/h (330 m/s) and c is $3 \times 10^8$ m/s, $v/c = (330/3 \times 10^8) = 1.1 \times 10^{-6}$, or 1.1 ppm (parts per million). In terms of Doppler Rate, the Doppler frequency shift will be $1.1 \times 10^{-6}$ Hz for every 1 Hz (or 1.1 Hz for every MHz). Similarly, in terms of timing drift due to Doppler effect, the timing drift will be $1.1 \times 10^{-6}$ second for every second, or 1.1 us/s.

Thus, for a remote operating at an upstream transmission frequency of 14.5 GHz on an aircraft moving at a speed of approximately 1188 Km/hour which experiences an acceleration of 17 m/s$^2$, a frequency shift of 15950 Hz, a frequency drift of 822 Hz/s, and a timing drift of 1100 ns/s will be observed at a hub that receives an upstream transmission from the remote, due to Doppler shift. Over time, the timing and frequency shifts and drifts may exceed tolerance limits of a demodulator of the hub, which may lead to erroneous symbol decisions, data loss, and communication link failure in a conventional system.

Conventional frequency error correction in a satellite network may include averaging collected estimated frequency errors over a predetermined Upstream Control Protocol (UCP) time period. Thus, conventionally, an average estimate of frequency error was produced that corresponds only generally with a UCP period, regardless of the time duration of the UCP period. This approach may be suitable for communication networks consisting of stationary remotes and geostationary (GEO) satellites. However, in the context of communication-on-the-move (COTM) networks and/or networks involving non-GEO satellites, a slant distance between a satellite and a remote may shift very rapidly because of relative movement between the satellite and the remote, causing timing and frequency shifts and drifts that cannot be compensated for using a simple arithmetic average of estimated frequency errors. Additionally, the estimated frequency errors include noise, because the estimated frequency offsets, which are produced by a hub of the satellite network, are not perfectly accurate.

Although a hub of a network is able to determine (i.e., estimate) frequency offset values on a burst by burst basis based on received bursts from a remote, bursts transmitted from a remote can be regular or sporadic, which results in a non-uniform distribution of the estimated frequency offset values over time at the hub. Additionally, a sequence of the determined frequency offset values may be different than a sequence of bursts from which the frequency offset values were determined, due to network routing that varies over time, communication protocols that vary over time, and hardware processing delays which depend upon the communication protocols and network routing that varies over time, for example. These characteristics of the determined frequency offset values may not present a problem conventionally, when a simple average of the frequency offset values is determined regardless of the time sequencing and time non-uniformity of determined frequency offset values. However, the conventional simple average method is not suitable in the context of COTM networks.

Thus, a frequency offset estimation and correction solution is needed which performs favorably in the context of COTM networks including noise in estimated frequency errors. The frequency offset estimation and correction solution may be able to correct an estimated frequency offset error in a closed loop with a remote of the satellite network and also account for a communications delay between the hub and the remote of the satellite network in the closed loop.

FIG. 1 is a block diagram of a communications system 100 according to an embodiment of the present invention including a hub 102, remotes 104 and 106, and a satellite 108. The satellite 108 may include a GEO or a non-GEO satellite. As illustrated in FIG. 1, the hub 102 may communicate with at least one of the remotes 104 and 106 via a satellite 108 over a downlink 110. Additionally, the remotes 104 and 106 communicate with the hub 102 via the satellite 108 over an uplink 112. Thus, the hub 102 and the remotes 104 and 106 include transmitters and receivers for communication via the downlink 110 and the uplink 112. Here, the downlink 110 includes data transmitted from the hub 102 to the remotes 104 and 106, and the uplink 112 includes data transmitted from one of the remotes 104 and 106 to the hub. The remotes 104 and 106 include examples of a remote 104 at a fixed location, and a remote 106 which is not fixed with respect to a geographic location. The remote 106 may be on, in, or integrated with a moving vehicle, such as a marine vessel, automobile, aircraft, or other mobile vehicle. Alternatively, the remote 106 may be stationary, during at least some periods of time.

The remotes 104 and 106 communicate with client computers 124 and client peripherals 126 via a local or wide area network (LAN/WAN) 114. The hub 102 communicates with, for example, internet services 116, data services 118, and voice services 120, via a LAN/WAN 114. Thus, the client computers 124 and the client peripherals 126 may access the internet services 116, the data services 118, and the voice services 120 via the uplink 110 and the downlink 112. Additionally, an operator of the communication system 100 may access parameters of the communication system 100 via the network operator access 122.

With reference to FIG. 1, observed frequency offsets of carrier signals received from the remotes 104 and 106 are tracked by the hub 102, so that frequency offset correction commands can be sent to the remotes 104 and 106. However, in embodiments of the communications system 100, frequency offset values that indicate a difference between a reference frequency of the hub 102 and an observed carrier frequency of a received signal are determined non-uniformly and disordered in time during a UCP period. The received frequency offset values are determined non-uniformly and disordered in time during the upstream control protocol UCP period, for example, because of network routing that varies over time, communication protocols that vary over time, and hardware processing delays which depend upon the communication protocols and network routing that varies over time, for example.

FIG. 2 is a functional block diagram of a frequency offset estimation and correction apparatus 200 according to an embodiment of the present invention. The frequency offset estimation and correction apparatus 200 may be included within one or more of the hub 102 and the remotes 104 and 106. The frequency offset estimation and correction apparatus 200 includes a frame averaging unit 202, a re-sampling unit 204, and an exponential averaging unit 206. In some embodiments, the apparatus 200 may optionally include a linear prediction unit 208 and/or a frequency offset correction unit 210. In yet other embodiments, the frame averaging unit 202, the re-sampling unit 204, the exponential averaging unit 206, and the linear prediction unit 208 may be included in the hub 102, and the frequency offset correction unit 210 may be included in one or more of the remotes 104 and 106.

The frame averaging unit 202 averages, for each of a plurality of frames, a plurality of frequency offset values within a frame of the plurality of frames, to obtain a frame offset average for the frame. The re-sampling unit 204 produces, for each of the plurality of frames, a plurality of interpolated frequency offset values uniformly distributed over a time period of a frame of the plurality of frames, based on the frame offset average of the frame and a frame offset average of at least one frame that precedes the frame. The exponential averaging unit 206 calculates an estimated frequency offset based on the plurality of interpolated frequency offset values weighted by an exponential averaging coefficient. The linear prediction unit 208 determines a predicted frequency offset based on the estimated frequency offset and a communications delay between the hub 102 and one of the remotes 104 and 106. The predicted frequency offset includes a frequency offset predicted according to a time period of a communications delay between the hub 102 and one of the remotes 104 and 106. The frequency offset correction unit 210 synchronizes a carrier frequency source and applies a predicted timing correction to transmitted bursts, to account for the estimated or predicted frequency offset and a predicted timing drift predicted over a UCP period.

FIG. 3 is a functional block diagram of the frame averaging unit 202 of FIG. 2. As illustrated in FIG. 3, the frame averaging unit 202 includes a frame sequencing unit 302 and a frame average unit 304. The frame sequencing unit 302 sequences the plurality of frequency offset values among N-frame blocks based on sequence numbers in received bursts, to produce sequenced frequency offset values, and the frame average unit 304 averages the sequenced frequency offset values to obtain the frame offset average of each frame.

In the present embodiment of the invention, the frequency offset estimation apparatus operates over individual UCP periods, which are 5 seconds in duration. Within each UCP period, a plurality of frames exist which are each 125 ms in duration. However, time periods of the UCP and the frames within each UCP may be other than 5 s and 125 ms, respectively, as would be understood by one having ordinary skill in the art, and are also included within the scope of the invention.

To address the fact that the plurality of frequency offset values are determined by the hub 102 out of sequence with respect to timings of bursts from which the plurality of frequency offset values were determined, the frame sequencing unit 302 sequences the plurality of frequency offset values by "un-wrapping" each frequency offset value, $ferr_k$, based on a "wrapped" sequence number, $n_k$, of a burst associated with each frequency offset value $ferr_k$, to arrive at an "un-wrapped"

sequence number, $m_k$. In the following explanation, a wrapped sequence number and associated frequency offset estimate pair are referred to as $(n_k, ferr_k)$, and an un-wrapped sequence number and associated frequency offset estimate pair are referred to as $(m_k, ferr_k)$, where $ferr_k$ is the same for each pair. The operation of the frame sequencing unit 302 is described in further detail below with reference to FIGS. 6 and 8.

After the frame sequencing unit 302 sequences the frequency offset values, the frame average unit 304 averages every frequency offset value associated with a frame, by referring to the values of the un-wrapped sequence numbers $m_k$. That is, every frequency offset value $ferr_k$ associated with an un-wrapped sequence number $m_k$ that has a value which designates the $n^{th}$ frame is averaged, to obtain a frame offset average of the $n^{th}$ frame, frm_av(n). The frame sequencing unit 302 averages the frequency offset values associated with a frame by a simple average. Specifically, the frame sequencing unit 302 averages the frequency offset values associated with a frame by summing the values of each of the frequency offset values of the frame, and dividing the sum by a number of the frequency offset values of the frame. It is noted that, frames may exist without having any associated frequency offset values. In that case, no frame offset average may be obtained for the frame, as the frame may not be associated with at least one frequency offset value. The operation of the frame average unit 304 is described in further detail below with reference to FIG. 9.

Referring back to FIG. 2, the re-sampling unit 204 produces a plurality of interpolated frequency offset values uniformly distributed over a time period of a frame, based on the frame offset average of the frame and a frame offset average of at least one frame that precedes the frame. In the present embodiment of the invention, the number of interpolated frequency offset values per frame (or number of bursts per frame), nbpf, is 10. However, other numbers of interpolated frequency offset values per frame would be understood by one having ordinary skill in the art, and are also included within the scope of the invention. In this case, the re-sampling unit 204 produces 10 uniformly interpolated frequency offset values per frame. The re-sampling unit 204 produces the $n^{th}$ interpolated frequency offset value of frame a, $frm_a\_itp(n)$, according to equation (2):

$$frm_a\_itp(n) = frm\_av(a-1) + \left(\frac{n}{nbpf}\right)(frm\_av(a) - frm\_av(a-1)), \quad (2)$$

where $frm_a\_itp(n)$ is the $n^{th}$ interpolated frequency offset value of frame a; n ranges from 1 to nbpf; frm_av(a−1) is the frame offset average of a frame previous to frame a; and frm_av(a) is the frame offset average of frame a. In the remainder of this disclosure, the interpolated frequency offset values produced for all frames are designated as frm_itp(n), without any particular frame designation, as a concatenated string of the interpolated frequency offset values of each frame with respect to the original ordering of the frames in a UCP. The operation of the re-sampling unit 204 is described in further detail below with reference to FIG. 10.

The exponential averaging unit 206 calculates an estimated frequency offset based on the interpolated frequency offset values and an exponential averaging coefficient, α. With reference to an $n^{th}$ interpolated frequency offset value, the exponential averaging unit 206 calculates the $n^{th}$ estimated frequency offset sample, frm_exp_av(n), according to equations (3) and (4):

$$frm\_exp\_av(n) = (\alpha * frm\_itp(n)) + ((1 - \alpha) * frm\_exp\_av(n - 1)) \quad (3)$$

$$\alpha = \frac{2}{nfw \cdot nbpf + 1}, \text{ where} \quad (4)$$

nfw is an equivalent moving average window size, in units of frames. The estimated frequency offset may be used directly by the frequency offset correction unit 210 to correct a frequency offset of a carrier frequency source. In an embodiment where the frequency offset correction unit 210 is included within one of the remotes 104 and 106, the estimated frequency offset may be transmitted in a frequency error correction command from the hub 102 to the one of the remotes 104 and 106, so that a frequency offset of a carrier frequency source of the one of the remotes 104 and 106 may be corrected. The operation of the exponential averaging unit 206 and the selection of the equivalent moving average window size nfw is described in further detail below with reference to FIGS. 7 and 11.

The linear prediction unit 208 determines a predicted frequency offset, $ferr_{proj}$, based on a last estimated frequency offset sample, an estimated frequency offset sample from p frames before the last estimated frequency offset sample, and a known communications delay q between the hub 102 and one of the remotes 104 and 106. More specifically, the value of $ferr_{proj}$ is determined according to a difference between the last sample of the exponential average frm_exp_av($n_{last}$) and a sample of the exponential average p frames before the last sample of the exponential average, frm_exp_av($n_{last}$−nbpf*p), and the known communications delay q (in units of a number of frames), according to equation (5):

$$ferr_{proj} = frm\_exp\_av(n_{last}) + (q/p)(frm\_exp\_av(n_{last}) - frm\_exp\_av(n_{last}-nbpf*p)) \quad (5)$$

In embodiments of the invention that include the linear prediction unit 208, the predicted frequency offset may be used directly by the frequency offset correction unit 210 to correct a frequency offset of a carrier frequency source. In an embodiment where the frequency offset correction unit 210 is included within one of the remotes 104 and 106, the predicted frequency offset may be transmitted in a frequency error correction command from the hub 102 to the one of the remotes 104 and 106, so that a carrier frequency offset of a carrier frequency source of the one of the remotes 104 and 106 may be corrected. The operation of the linear prediction unit 208 is described in further detail below with reference to FIG. 12.

It is noted that it is not necessary that the frequency offset correction unit 210 be implemented in the same apparatus as the remainder of the frequency offset estimation and correction apparatus 200. Instead, the frame averaging unit 202, the re-sampling unit 204, the exponential averaging unit 206, and the linear prediction unit 208 may be implemented at the hub 102, and the frequency offset correction unit 210 may be implemented at the remotes 104 and 106 (or vice versa).

Figure 4:
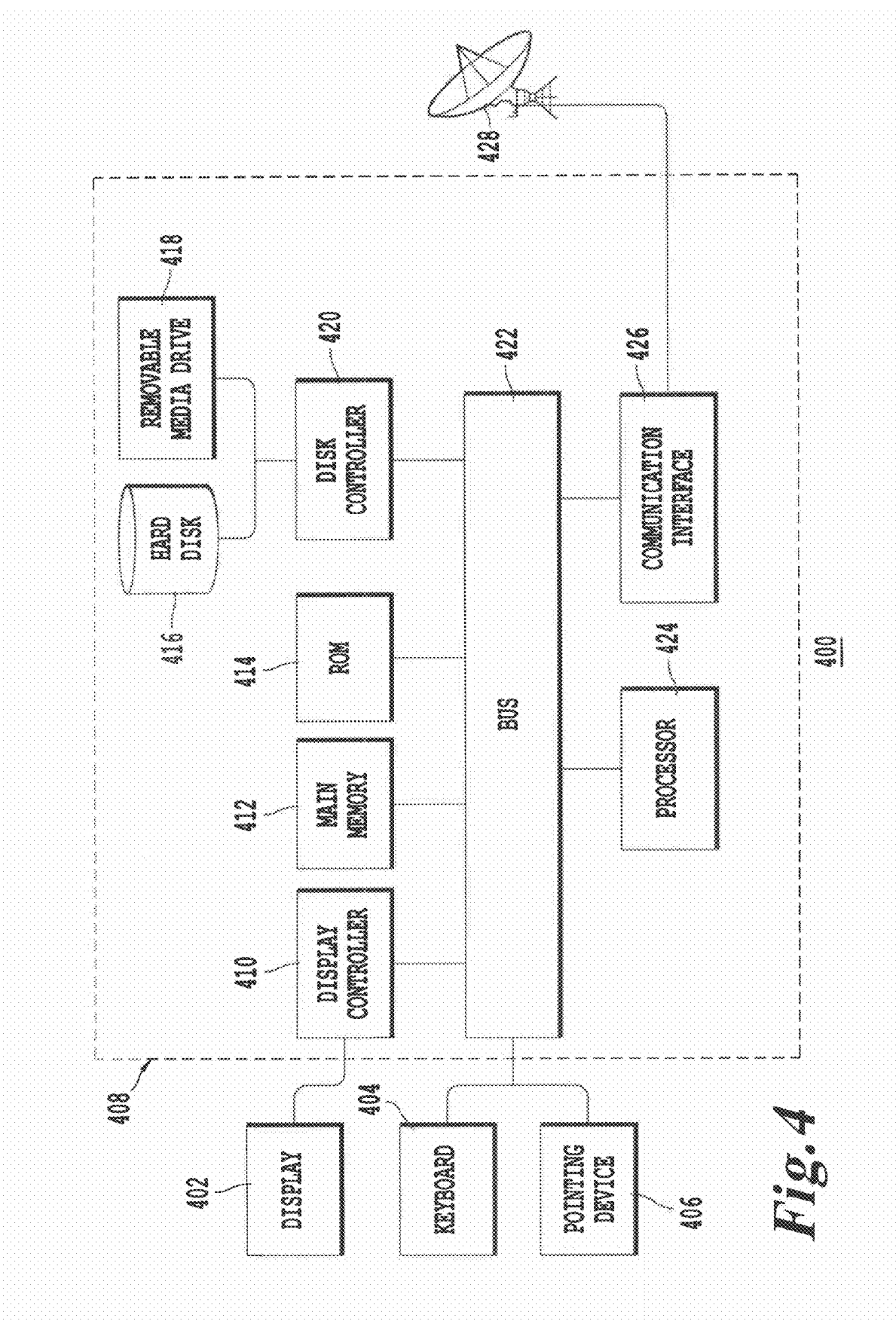
FIG. 4 is a schematic block diagram illustrating a data processing apparatus.

FIG. 4 illustrates an embodiment of a hardware configuration 400 of the hub 102 and/or the remotes 104 and 106 in which the frequency offset estimation and correction apparatus 200 of FIG. 2 may be implemented based on execution of a software program. Alternatively, other manners of implementing the present invention would be understood by one having ordinary skill in the art, and are also included within the scope of the invention. For example, the present invention may be implemented using hardware without software, firmware, or combinations of hardware, software, and firmware. The hardware configuration 400 includes a general purpose computer 408 including a bus 422 that connects a display controller 410, a main memory 412, a Read Only Memory (ROM) 414, a disk controller 420, a general purpose arithmetic processor 424, and a communication interface 426. The disk controller 420 interfaces several computer readable mediums to the bus 422, such as a hard disk 416 and a removable media drive 418. A user may interface with the general purpose computer 408 via a display 402, a keyboard 404, and a pointing device 406. The display controller 410 renders images provided to the display 402.

The communication interface 426 connects to an antenna 428 for communication over a satellite network. Thus, the communication interface 426 includes receivers and transmitters for communication over a satellite network, such as hardware circuit components necessary to up-convert a frequency and/or phase modulated carrier signal to a frequency suitable for RF transmission. As part of a non-limiting group of hardware components, the communication interface 426 may include a reference frequency source, Digital-to-Analog Converters (DACs), Voltage Controlled Oscillators (VCO), Phase Locked Loops (PLLs) and frequency synchronizers, mixers, analog filters, Low Noise Amplifiers (LNAs), and other hardware components recognized as being used to up-convert a modulated carrier to a frequency suitable for RF transmission.

In operation, the arithmetic processor 424 retrieves executable instructions stored on the hard disk 416 and/or the removable media drive 418, stores the executable instructions to the main memory 412, and executes the executable instructions from the main memory. Alternatively, the arithmetic processor 424 may execute instructions directly from the hard disk 416 and/or the removable media drive 418 to implement the present invention. As an alternative to the hard disk 416 and/or the removable media drive 418, other computer readable storage mediums would be understood by those one having ordinary skill in the art, and are also included in the scope of the invention. Examples of the arithmetic processor 424 include a general purpose Central Processing Unit (CPU) and a Digital Signal Processor (DSP), for embodiments of the invention based at least in part on the execution of software, and a Field Programmable Gate Array (FPGA) and an Application Specific Integrated Circuit (ASIC), for embodiments of the invention based on hardware without software.

Embodiments of the invention may also include both general purpose processors executing software instructions (i.e., CPUs and/or DSPs) as well as FPGAs and/or ASICs.

Figure 5:
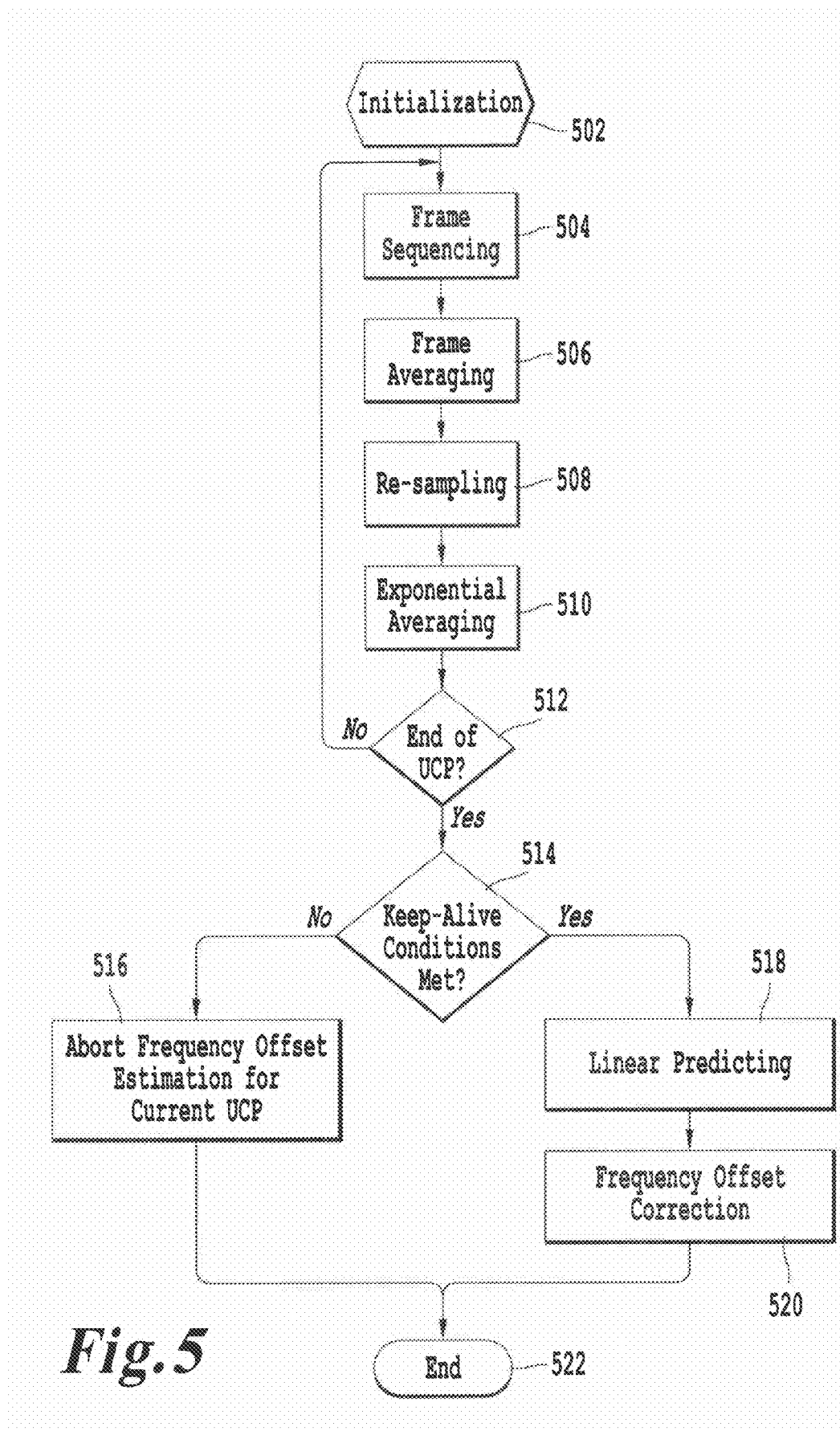
FIG. 5 is a flow diagram illustrating a frequency offset estimation method.

FIG. 5 is a flow diagram of an embodiment of a frequency offset estimation and correction method 500 performed by the frequency offset estimation and correction apparatus 200 of FIG. 2. The frequency offset estimation and correction method 500 includes initialization at step 502, frame sequencing at step 504, frame averaging at step 506, re-sampling at step 508, and exponential averaging at step 510. After the exponential averaging at step 510, the frequency offset estimation and correction method 500 further includes an end of UCP check at step 512, followed by a keep-alive conditions check at step 514. At the end of UCP check at step 512, it is determined whether the frame sequencing at step 504, the frame averaging at step 506, the re-sampling at step 508, and the exponential averaging at step 510 has been executed over an entirety of a current UCP. If execution has occurred for the entirety of (i.e., through the end of) the current UCP, execution proceeds to the keep-alive conditions check at step 514. If execution has not been completed through the end of the current UCP, execution of the frame sequencing at step 504, the frame averaging at step 506, the re-sampling at step 508, and the exponential averaging at step 510 continues, as illustrated in FIG. 5.

At the keep-alive conditions check at step 514, it is determined whether the keep-alive conditions have been met. In one embodiment of the present invention, the keep-alive conditions include (1) a number of the frequency offset values determined by the hub 102 being no less than 3 within the current UCP period, (2) at least one frequency offset value being received within a last second of the current UCP period, and (3) a time span between a first and a last frequency offset value being greater than 10 frames of time. Other "keep alive" conditions would be understood by one having ordinary skill in the art, and are within the scope of the invention. If the keep-alive conditions check at step 514 is true, the frequency offset estimation and correction method 500 continues with linear predicting at step 518, and frequency offset correction at step 520. If the keep-alive conditions check at step 514 is false, execution of the frequency offset estimation and correction method 500 continues to step 516, where frequency offset estimation for the current UCP is aborted. The frequency offset estimation and correction method 500 ends at step 522, as illustrated in FIG. 5.

Figure 6:
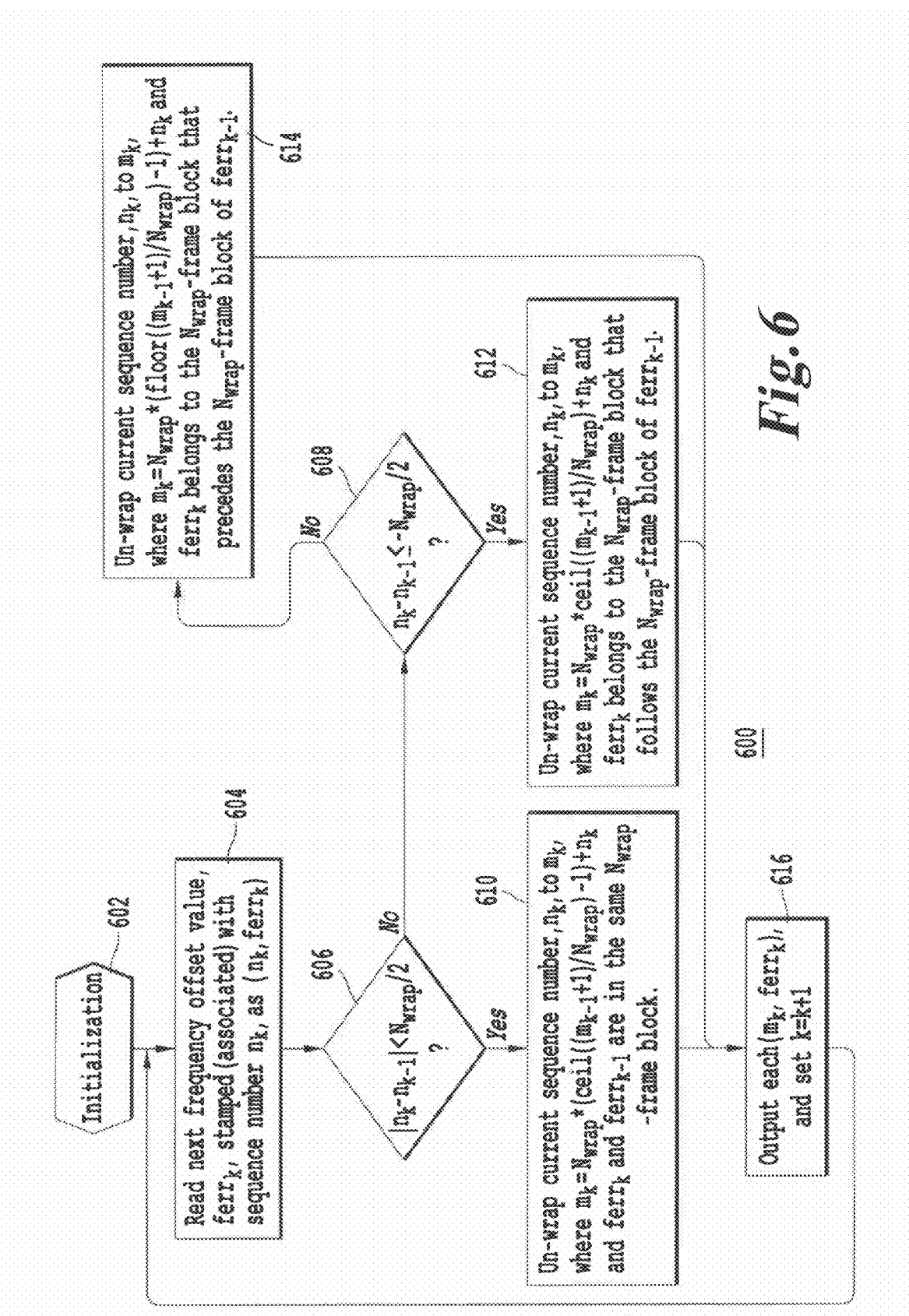
FIG. 6 is a flow diagram illustrating a re-sampling method.

FIG. 6 is a flow diagram of a frame sequencing method 600 corresponding to the frame sequencing 504 of FIG. 5, which is performed by the frame sequencing unit 302 of FIG. 3. The frame sequencing method 600 includes initialization at step 602 and receiving a current frequency estimate ferr$_k$ stamped (i.e., associated) with a sequence number $n_k$, as ($n_k$, ferr$_k$), at step 604. The initialization includes setting an initial wrapped sequence number, $n_0$, to 0, setting an initial un-wrapped sequence number, $m_0$, to 0, and setting the index of the frame sequencing method 600, k, equal to 0.

At step 606, it is determined whether $|n_k - n_{k-1}| < N_{wrap}/2$, where $N_{wrap}$ is selected to be at least 2 times the maximum acceptable number of missing frame averages. For convenience, $N_{wrap}$ is set to be equal to 16 in the following example of the frame sequencing method 600. In practice, for a UCP duration of 5 s and a frame duration of 125 ms, $N_{wrap}$ may be selected to be 64, for example, to allow sequencing for up to a single sequence of 32 frame averages, based on 'keep-alive' requirements of the frequency offset estimation method. Other values of $N_{wrap}$ may be also selected. If the conditions at step 606 are true, the frame sequencing method 600 proceeds to step 610, where the value of the un-wrapped sequence number $m_k$ to be associated with the current frequency estimate ferr$_k$ is set to be equal to $N_{wrap}*\text{ceil}((m_{k-1}+1)/N_{wrap}-1)+n_k$, and it is determined that the current frequency offset value ferr$_k$ belongs to the same $N_{wrap}$-frame block as the previous frequency offset value ferr$_{k-1}$, which is also associated with the previous un-wrapped sequence number $m_{k-1}$. If the conditions at step 606 are false, execution of the frame sequencing method 600 proceeds to step 608, where it is determined whether $n_k - n_{k-1} \leq -N_{wrap}/2$. If the conditions at step 608 are true, the frame sequencing method 600 proceeds to step 612, where the value of the un-wrapped sequence number $m_k$ to be associated with the current frequency estimate ferr$_k$ is set to be equal to $N_{wrap}*\text{ceil}((m_{k-1}+1)/N_{wrap})+n_k$, and it is determined that the current frequency offset value ferr$_k$ belongs to the $N_{wrap}$-frame block that follows the $N_{wrap}$-frame block of the previous frequency offset value ferr$_{k-1}$, which is also associated with the previous un-wrapped sequence number $m_{k-1}$. If the conditions at step 608 are false, the frame sequencing method 600 proceeds to step 614, where the value of the un-wrapped sequence number $m_k$ to be associated with the current frequency estimate $ferr_k$ is set to be equal to $N_{wrap}*floor((m_{k-1}+1)/N_{wrap}-1)+n_k$, and it is determined that the current frequency offset value $ferr_k$ belongs to the $N_{wrap}$-frame block that precedes the $N_{wrap}$-frame block of the previous frequency offset value $ferr_{k-1}$, which is also associated with the previous un-wrapped sequence number $m_{k-1}$.

In the frame sequencing method 600, it is noted that the function ceil(x) returns the smallest integer not less than x, where x may be any real number, and that the function floor(x) returns largest integer not greater than x, where x may be any real number.

Thus, the frame sequencing method 600 produces an un-wrapped sequence number $m_k$ for each wrapped sequence number $n_k$, which is associated with the frequency offset value $ferr_k$ of the wrapped sequence number $n_k$, and determines which $N_{wrap}$-frame block the frequency offset value $ferr_k$ belongs to. Each of the values of the un-wrapped sequence numbers $m_k$, as determined in any one of steps 610, 612, and 614 of the frame sequencing method 600, indicates a frame number within the $N_{wrap}$-frame block to which it belongs. It is also noted that, within any $N_{wrap}$-frame block, more than one un-wrapped sequence number $m_k$ may be determined to have the same value. In this case, the frame sequencing method 600 has determined that more than one frequency offset value $ferr_k$ belongs to the indicated frame. The frame sequencing method 600 further includes step 616, which occurs after steps 610, 612, and 614, where each frequency offset value and associated un-wrapped sequence number pair ($m_k$, $ferr_k$) is output, and the index k is incremented by one.

Figure 7:
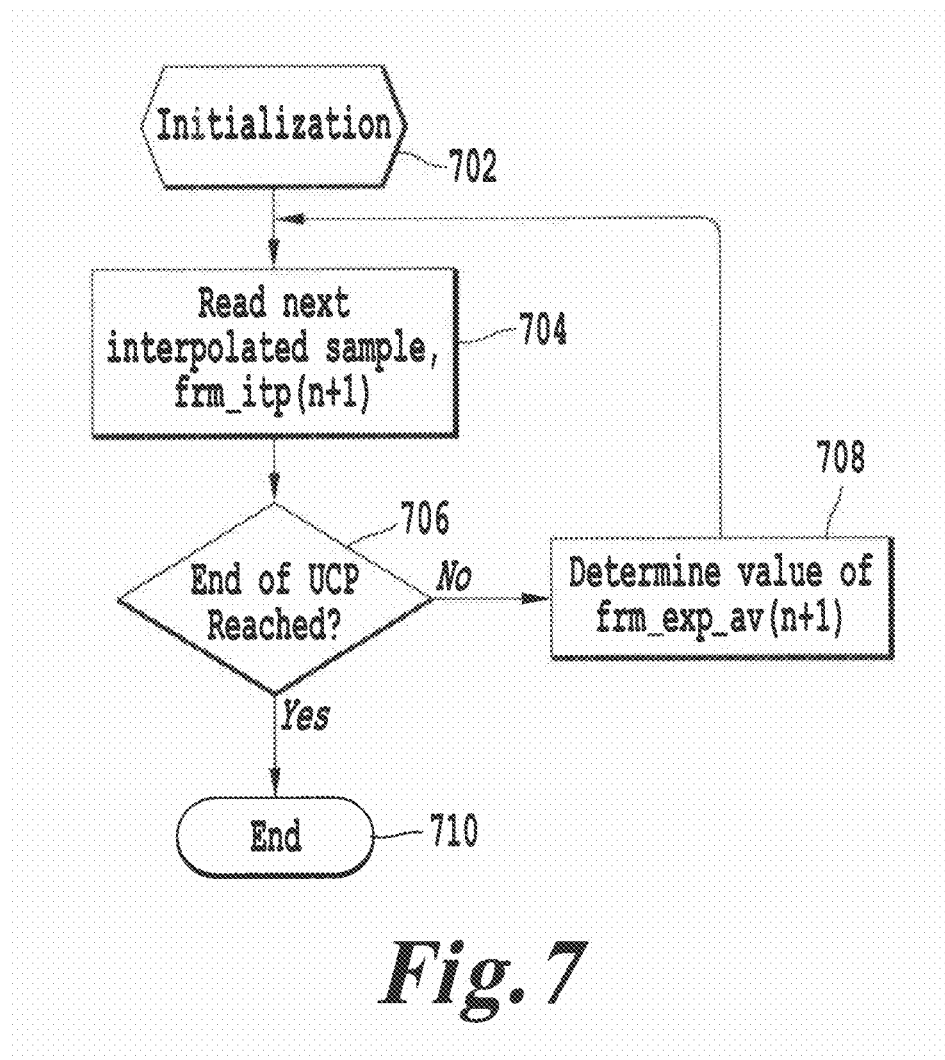
FIG. 7 is a flow diagram illustrating an exponential averaging method.

FIG. 7 is a flow diagram of an exponential averaging method 700 corresponding to the exponential averaging at 510 of FIG. 5, which is performed by the exponential averaging unit 206 of FIG. 2. The exponential averaging method 700 begins with initialization at step 702. At the start of a new UCP period, initialization at step 702 includes setting the initial value of the exponential average, frm_exp_av(0), equal to the first frame average value, frm_av(1), and setting the index of the exponential averaging method, n, equal to 0. A next interpolated sample, frm_itp(n+1), is read at step 704. After reading the next interpolated sample at step 704, the exponential averaging method 700 proceeds to step 706, where it is determined whether the end of the current UCP is reached. If the end of the current UCP period is not reached at 706, the exponential averaging method 700 proceeds to step 708, where a next exponential averaging sample, frm_exp_av(n+1), is determined according to the equation (3) above, and the index n is set to be equal to n+1.

After step 708, the exponential averaging method 700 proceeds back to step 704, where a next interpolated sample is read from memory. If the end of the current UCP is reached at step 706, the exponential averaging method 700 proceeds to step 710, where the exponential averaging method 700 ends, and execution of the frequency offset estimation and correction method 500 proceeds to the keep-alive conditions check at step 514 of FIG. 5.

Figure 8:
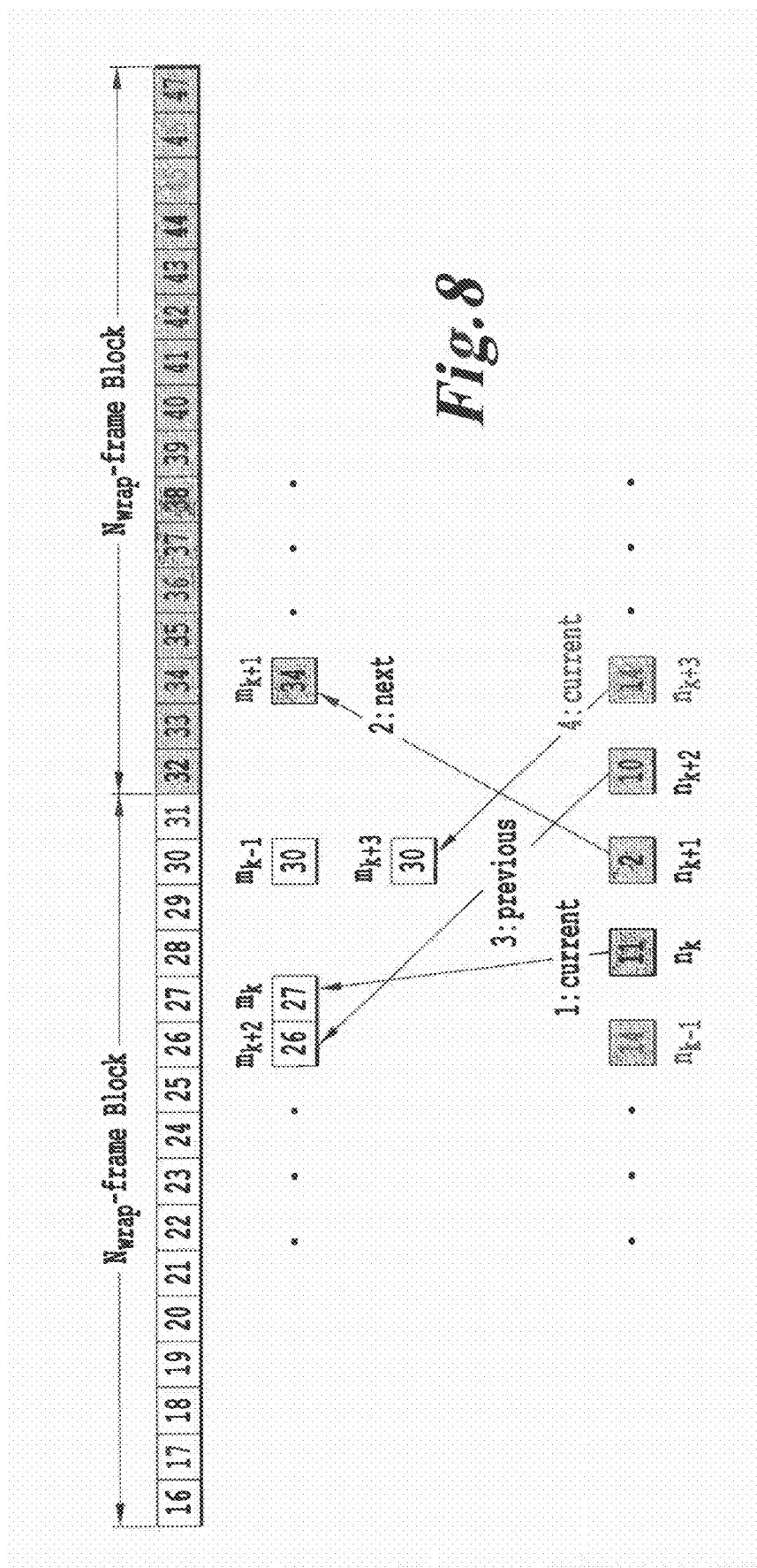
FIG. 8 is a graph illustrating frequency offset values and frame offset averages.

With reference to FIG. 8, an example of the frame sequencing method 600 of FIG. 6 is further described. In the example illustrated in FIG. 8, the values of the wrapped and un-wrapped sequence numbers and the value of $N_{wrap}$ are provided as an example. Other values are within the scope of the invention. At step 604 of FIG. 6, the value of the next wrapped sequence number $n_k$ is read as 11 according to the example illustrated in FIG. 8. Further, based on a previous iteration of the frame sequencing method 600 illustrated in FIG. 6 (but not described), the value of the previous wrapped sequence number $n_{k-1}$ is 14, and the value of the previous un-wrapped sequence number $m_{k-1}$ is 30. Thus, proceeding to step 606, the expression $|n_k-n_{k-1}|<N_{wrap}/2$ is evaluated as being true, as $|11-14|<16/2$ is true, and the value of $m_k$ is set to be equal to 27, as $N_{wrap}*ceil((m_{k-1}+1)/N_{wrap}-1)+n_k$ reduces to $16*ceil((30+1)/16-1)+11$, which equals 27. Additionally at step 606, $ferr_k$ and $ferr_{k-1}$ are determined to belong to the same $N_{wrap}$-frame block, as illustrated in FIG. 8. In the frame sequencing method 600, it is noted that the determination of the $N_{wrap}$-frame block to which the frequency offset value $ferr_k$ belongs is determined with respect to the $N_{wrap}$-frame block to which the previous frequency offset value $ferr_{k-1}$ belongs, either as the same $N_{wrap}$-frame block, the following $N_{wrap}$-frame block, or the preceding $N_{wrap}$-frame block to which the previous frequency offset value belongs. Proceeding to step 616, the values ($m_k$, $ferr_k$) are output and the index k is incremented by 1 to k+1. The frame sequencing method 600 is executed for all determined frequency offset values $ferr_k$ in a UCP period. More specifically, the frame sequencing method 600 ends when an "End of UCP" signal is received and starts again after a "Start of UCP" is received, which is immediately after a previous "End of UCP" signal is received. The "Start of UCP" and "End of UCP" signals are generated periodically by the hub.

Next, the frame sequencing method 600 continues back to step 604, where the value of the next wrapped sequence number $n_{k+1}$ is read as 2. Further, based on the previous iteration, the value of the previous wrapped sequence number $n_k$ is 11, and the value of the previous un-wrapped sequence number $m_k$ is 27. Proceeding to step 606, the expression $|n_{k+1}-n_k|<N_{wrap}/2$ is evaluated as being false, as $|2-11|<16/2$ is false, and the frame sequencing method 600 proceeds to step 608, where the expression $n_{k+1}-n_k<-N_{wrap}/2$ is evaluated as being true, as $2-11<-16/2$ is true. Accordingly, the frame sequencing method 600 continues to step 612, where the value of the next un-wrapped sequence number $m_{k+}$ to be associated with the current frequency estimate $ferr_{k+}$ is set to be equal to 34, as $N_{wrap}*ceil((m_k+1)/N_{wrap})+n_{k+1}$ reduces to $16*ceil((27+1)/16)+2$, which equals 34. Additionally at step 612, $ferr_{k+1}$ is determined to belong to the $N_{wrap}$-frame block that follows the $N_{wrap}$-frame block to which the frequency offset value $ferr_k$ belongs, as illustrated in FIG. 8. Proceeding again to step 616, the values ($m_{k+1}$, $ferr_{k+1}$) are output and the index k is incremented by 1 to k+2.

The frame sequencing method 600 continues again back to step 604, where the value of the next wrapped sequence number $n_{k+2}$ is read as 10. Further, based on the previous iteration, the value of the previous wrapped sequence number $n_{k+1}$ is 2, and the value of the previous un-wrapped sequence number $m_{k+1}$ is 34. Proceeding to step 606, the expression $|n_{k+2}-n_{k+1}|<N_{wrap}/2$ is evaluated as being false, as $|10-2|<16/2$ is false. The frame sequencing method 600 then proceeds to step 608, where the expression $n_{k+2}-n_{k+1}<-N_{wrap}/2$ is evaluated as being false, as $10-2<-16/2$ is false. The frame sequencing method 600 then proceeds to step 614, where the value of the un-wrapped sequence number $m_{k+2}$ to be associated with the current frequency estimate $ferr_{k+2}$ is set to be equal to 26, as $N_{wrap}*floor((m_{k+1}+1)/N_{wrap}-1)+n_{k+2}$ reduces to $16*floor((34+1)/16-1)+10$, which equals 26. Additionally at 614, $ferr_{k+2}$ is determined to belong to the $N_{wrap}$-frame block that precedes the $N_{wrap}$-frame block to which the frequency offset value $ferr_{k+1}$ belongs, as illustrated in FIG. 8. Proceeding again to step 616, the values ($m_{k+2}$, $ferr_{k+2}$) are output and the index k is incremented by 1 to k+3.

The frame sequencing method 600 continues again back to step 604, where the value of the next wrapped sequence number $n_{k+3}$ is read as 14 according to the example illustrated in FIG. 8. Further, based on the previous iteration, the value of the previous wrapped sequence number $n_{k+2}$ is 10, and the value of the previous un-wrapped sequence number $m_{k+2}$ is 26. Proceeding to step 606, the expression $|n_{k+3}-n_{k+2}|<N_{wrap}/2$ is evaluated as being true, as $|14-10|<16/2$ is true, and the value of $m_{k+3}$ is set to be equal to 30, as $N_{wrap}*\text{ceil}((m_{k+2}+1)/N_{wrap}-1)+n_{k+3}$ reduces to $16*\text{ceil}((26+1)/16-1)+14$, which equals 30.

Additionally at step 606, $\text{ferr}_{k+3}$ and $\text{ferr}_{k+2}$ are determined to belong to the same $N_{wrap}$-frame block, as illustrated in FIG. 8. Here, it is noted that the frequency offset value $\text{ferr}_{k+3}$ belongs to frame 30 of the same $N_{wrap}$-frame block to which the frequency offset value $\text{ferr}_{k-1}$ belongs, as illustrated in FIG. 8. Proceeding to step 616, the values $(m_{k+3}, \text{ferr}_{k+3})$ are output and the index k is again incremented by 1.

Figure 9:
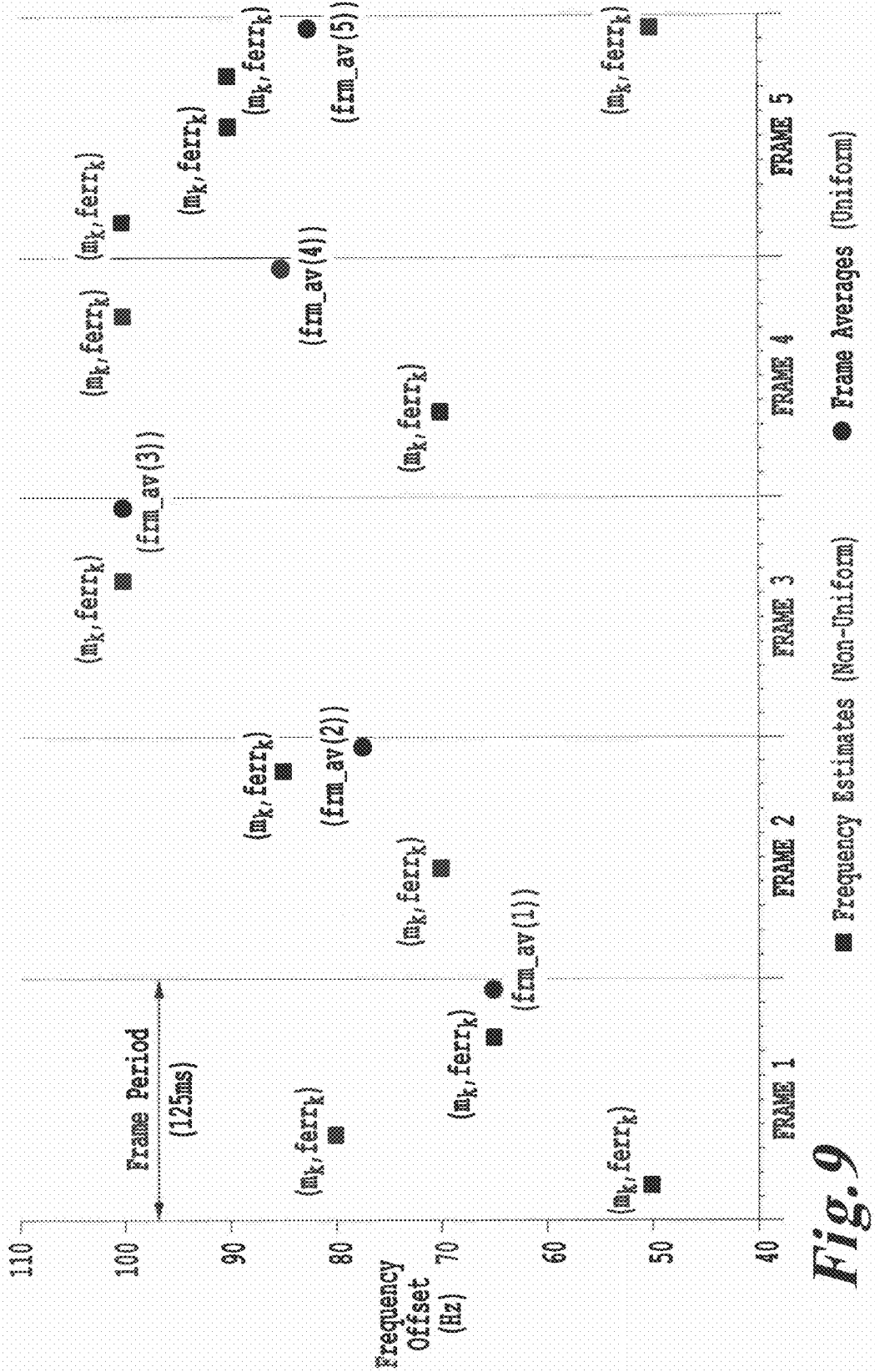
FIG. 9 is a chart illustrating sequencing of frame sequence numbers.

With reference to FIG. 9, an example of the frame averaging at step 506 of FIG. 5 is further described. In the example illustrated in FIG. 9, 5 frames of a UCP period are illustrated. In FIG. 9, the vertical or y-axis represents frequency offset, and the horizontal or x-axis represents frame periods. Frame 1 in the example of FIG. 9 includes three un-wrapped frame sequence number and associated frequency offset value pairs $(m_k, \text{ferr}_k)$, and a frame offset average for frame 1, $\text{frm\_av}(1)$. Frame 2 in the example of FIG. 9 includes two un-wrapped frame sequence number and associated frequency offset value pairs $(m_k, \text{ferr}_k)$, and a frame offset average for frame 2, $\text{frm\_av}(2)$. Frame 3 in the example of FIG. 9 includes one un-wrapped frame sequence number and associated frequency offset value pair $(m_k, \text{ferr}_k)$, and a frame offset average for frame 3, $\text{frm\_av}(3)$. Frame 4 in the example of FIG. 9 includes two un-wrapped frame sequence number and associated frequency offset value pairs $(m_k, \text{ferr}_k)$, and a frame offset average for frame 4, $\text{frm\_av}(4)$. Frame 5 in the example of FIG. 9 includes four un-wrapped frame sequence number and associated frequency offset value pairs $(m_k, \text{ferr}_k)$, and a frame offset average for frame 4, $\text{frm\_av}(4)$. The number of received frequency offset values per frame in FIG. 8 is an example. In practice, the number of received frequency offset values per frame may be greater, fewer, or even zero. Additionally, it is noted that, although FIG. 9 illustrates the un-wrapped frame sequence number and associated frequency offset value pairs $(m_k, \text{ferr}_k)$ at respective time positions within frames, the frame offset averages are determined based only on values of frequency offset values that belong to each frame (as indicated by the values of the un-wrapped frame sequence numbers), but not any timing within respective frames.

For each of the frames in the example of FIG. 9, the frame averaging unit 202 produces a simple average of each frequency offset value $\text{ferr}_k$ associated with the frame, to produce a frame offset average, $\text{frm\_av}(n)$, of the frame. For example, in frame 1 of FIG. 8, $\text{frm\_av}(1)$ is determined to be 65 Hz, based on an average of three frequency offset values, 50 Hz, 80 Hz, and 65 Hz. The frame offset averages for frames 2-5 are determined by the frame averaging unit 202 similarly.

Figure 10:
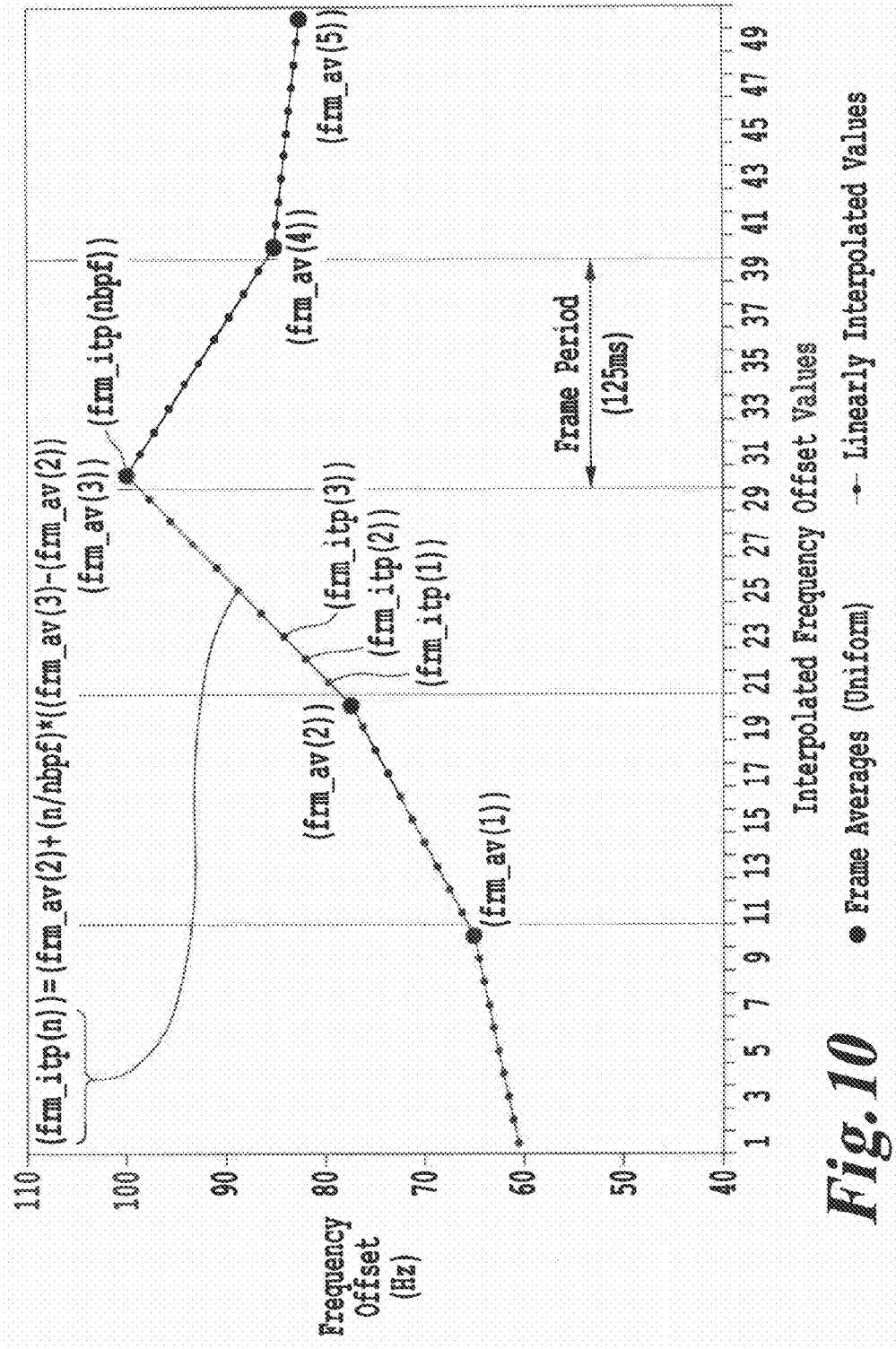
FIG. 10 is a graph illustrating frequency offset values, frame offset averages, and interpolated frequency offset values.

With reference to FIG. 10, the re-sampling at step 508 of FIG. 5 is further described. In FIG. 10, the vertical or y-axis represents interpolated frequency offset, and the horizontal or x-axis represents interpolated frequency offset or re-sampling values in time (i.e., nbpf points per frame). FIG. 10 illustrates the same five frames of the UCP period which are illustrated in FIG. 9. The re-sampling unit 204 produces a plurality of interpolated frequency offset values uniformly distributed over a time period, based on the frame offset averages. For example, with regard to frame 3, the re-sampling unit 204 produces nbpf interpolated frequency offset values, $\text{frm\_itp}(1)$, $\text{frm\_itp}(2)$, $\text{frm\_itp}(3)$, $\text{frm\_itp}(n)$, ... to $\text{frm\_itp}(\text{nbpf})$. Each interpolated frequency offset value $\text{frn\_itp}(n)$ of a frame is determined based on the value of nbpf (i.e., the number of interpolated frequency offset values per frame or number of bursts per frame) and at least two frame offset average values, based on an interpolation of nbpf frequency offset values being uniformly distributed between the at least two frame offset averages. For example, in frame 3 of FIG. 10, the $n^{th}$ frequency offset value $\text{frm\_itp}(n)$ is determined by the resampling unit 204 to be equal to $\text{frm\_av}(2)+(n/\text{nbpf})*((\text{frm\_av}(3)-(\text{frm\_av}(2)))$, according to the equation (2) above. In this manner, the re-sampling unit 204 produces uniformly distributed frequency offset values for each frame of a UCP period, as required by the exponential averaging unit 206. Here, it is noted that the frames in FIGS. 9 and 10 represent frames in the middle of a UCP period. For a first frame of a UCP period, no interpolated frequency offset values are determined by the re-sampling unit 204, as at least two frame offset average values have yet to be determined by the frame averaging unit 202.

Figure 11:
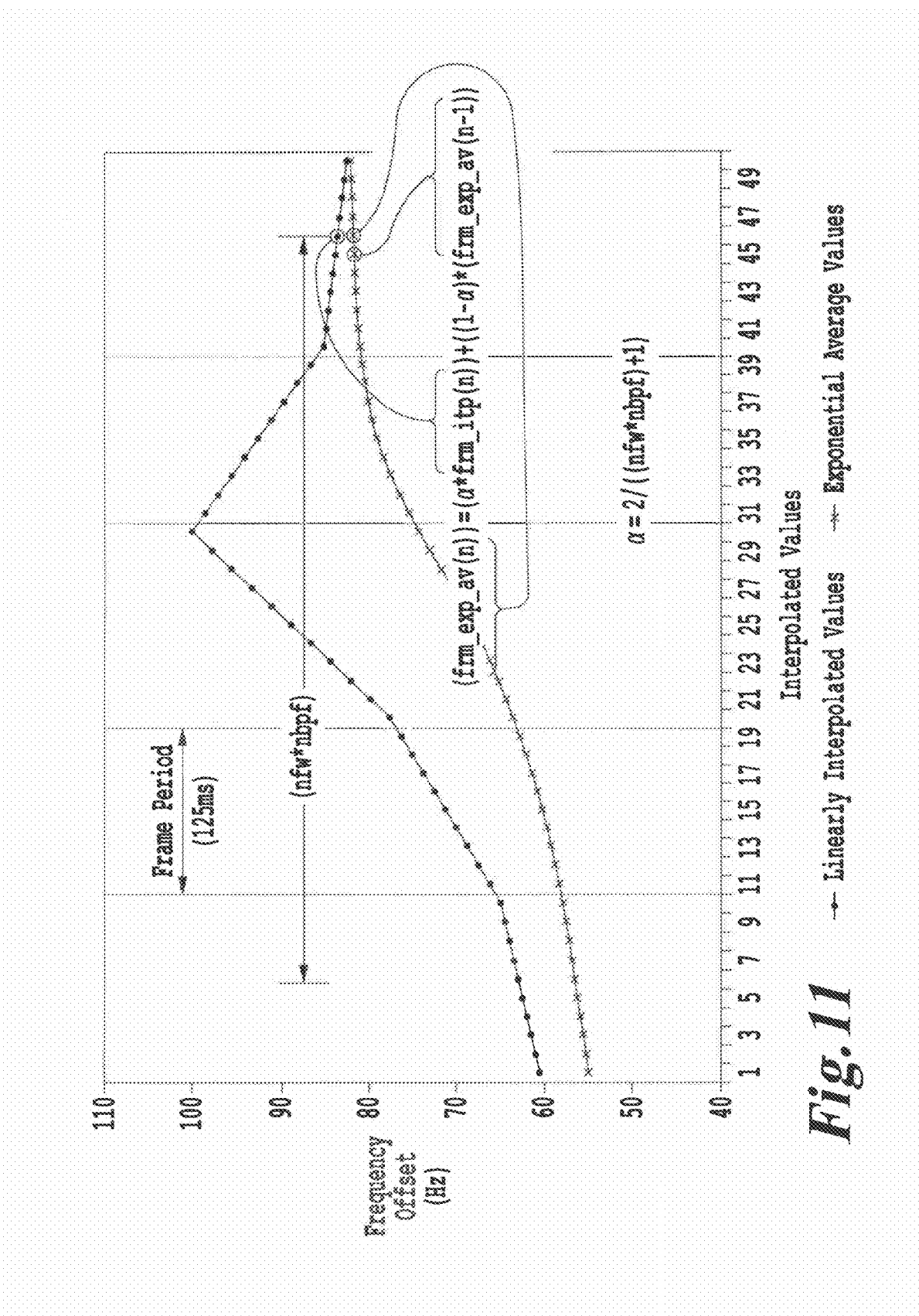
FIG. 11 is a graph illustrating frequency offset values, frame offset averages, interpolated frequency offset values, and exponential average samples.

With reference to FIG. 11, the exponential averaging at step 510 of FIG. 5 is further described. In FIG. 11, the vertical or y-axis represents interpolated frequency offset, and the horizontal or x-axis represents the interpolated frequency offset or re-sampling values in time. As illustrated, the exponential averaging unit 206 calculates estimated frequency offset values based on the plurality of interpolated frequency offset values weighted by an exponential averaging coefficient $\alpha$. Specifically, the $n^{th}$ value of the exponential average, $\text{frm\_exp\_av}(n)$, is determined by the exponential averaging unit 206 to be equal to $\alpha*\text{frm\_itp}(n)+((1-\alpha)*(\text{frm\_exp\_av}(n-1))$, according to the equation (3) above, where $\alpha$ is determined according to the equation (4) above.

Example values of the equivalent averaging window size nfw of the exponential averaging coefficient $\alpha$ were determined based on mean frequency errors between a reference frequency of a hub and a carrier frequency of a signal received by the hub, for different nfw values, as detailed in Tables 2 to 7. In Tables 2 to 7, the mean and standard deviation values (in Hz) for mean frequency errors were determined by simulating the frequency offset estimation algorithm of the present invention with a constant frequency drift rate over 1000 UCP periods, for constant frequency drifts of 0, 250, 500, 750, and 1000 Hz. Each 4-$\sigma$ peak frequency error value (in Hz) for an applied frequency drift in Tables 2 to 7 is equal to the mean frequency error plus 4 times the standard deviation of the mean frequency error for an applied frequency drift. Additionally, as a by-product of the linear predicting at 518 of FIG. 5, an estimated rate of frequency drift (in Hz per second) and a standard deviation of the estimated rate of frequency drift (in Hz per second) are also provided in Tables 2 to 7. The values of the equivalent averaging window size and the results listed in Tables 2 to 7 are provided as examples. Other values of nfw are would be understood by one having ordinary skill in the art, and are within the scope of the invention.

For the values in Table 2 below, the equivalent averaging window size nfw was set to 16, which provides an exponential averaging coefficient of 0.0124, according to the equation (4). Also, the number of frequency offset values, Ne, per UCP period was set to an average of 200, and the standard deviation of the frequency offset estimation, $\sigma_e$ was set to 50 Hz.

TABLE 2

| Applied Freq. Drift (Hz/s) | Mean Freq. Error (Hz) | Std. of Freq. Error (Hz) | 4-σ Peak Freq. Error (Hz) | Estimated Freq. Drift (Hz/s) | Std. of Freq. Drift (Hz/s) |
|---|---|---|---|---|---|
| 0 | 0.11 | 11.78 | 47.22 | −0.23 | 8.05 |
| 250 | 266.21 | 11.45 | 312.02 | 248.06 | 7.82 |
| 500 | 531.60 | 11.70 | 578.42 | 496.22 | 8.09 |
| 750 | 797.91 | 12.53 | 848.02 | 744.04 | 8.32 |
| 1000 | 1063.68 | 14.05 | 1119.90 | 991.92 | 9.30 | nfw = 16 (α = 0.0124);
Ne = 200 (average);
$\sigma_e$ = 50 Hz

For the values in Table 3 below, the equivalent averaging window size nfw was set to 16, which provides an exponential averaging coefficient of 0.0124. Also, the number of frequency offset values per UCP period, Ne, was set to an average of 5, and $\sigma_e$ was set to 50 Hz.

TABLE 3

| Applied Freq. Drift (Hz/s) | Mean Freq. Error (Hz) | Std. of Freq. Error (Hz) | 4-σ Peak Freq. Error (Hz) | Estimated Freq. Drift (Hz/s) | Std. of Freq. Drift (Hz/s) |
|---|---|---|---|---|---|
| 0 | −0.05 | 44.22 | 176.83 | −0.39 | 22.51 |
| 250 | 262.59 | 51.28 | 467.70 | 258.19 | 36.07 |
| 500 | 518.36 | 60.50 | 760.35 | 521.96 | 69.40 |
| 750 | 777.93 | 86.10 | 1122.35 | 783.55 | 101.34 |
| 1000 | 1045.34 | 81.08 | 1369.68 | 1034.23 | 107.90 | nfw = 16 (α = 0.0124);
Ne = 5;
$\sigma_e$ = 50 Hz

For the values in Table 4 below, the equivalent averaging window size nfw was set to 8, which provides an exponential averaging coefficient of 0.0247. Also, Ne was set to an average of 200, and $\sigma_e$ was set to 50 Hz.

TABLE 4

| Applied Freq. Drift (Hz/s) | Mean Freq. Error (Hz) | Std. of Freq. Error (Hz) | 4-σ Peak Freq. Error (Hz) | Estimated Freq. Drift (Hz/s) | Std. of Freq. Drift (Hz/s) |
|---|---|---|---|---|---|
| 0 | 0.72 | 17.28 | 69.83 | −0.50 | 12.30 |
| 250 | 140.54 | 17.36 | 210.00 | 249.86 | 12.17 |
| 500 | 281.78 | 18.22 | 354.65 | 499.23 | 13.10 |
| 750 | 423.10 | 18.93 | 498.82 | 749.00 | 13.55 |
| 1000 | 563.12 | 20.03 | 643.23 | 999.43 | 14.50 | nfw = 8 (α = 0.0247);
Ne = 200 (average);
$\sigma_e$ = 50 Hz

For the values in Table 5 below, the equivalent averaging window size nfw was set to 8, which provides an exponential averaging coefficient of 0.0247. Also, Ne was set to an average of 5, and $\sigma_e$ was set to 50 Hz.

TABLE 5

| Applied Freq. Drift (Hz/s) | Mean Freq. Error (Hz) | Std. of Freq. Error (Hz) | 4-σ Peak Freq. Error (Hz) | Estimated Freq. Drift (Hz/s) | Std. of Freq. Drift (Hz/s) |
|---|---|---|---|---|---|
| 0 | −1.13 | 61.63 | 245.38 | 0.61 | 32.90 |
| 250 | 135.57 | 69.10 | 411.98 | 254.29 | 39.31 |
| 500 | 273.91 | 81.40 | 599.52 | 508.33 | 57.00 |

TABLE 5-continued

| Applied Freq. Drift (Hz/s) | Mean Freq. Error (Hz) | Std. of Freq. Error (Hz) | 4-σ Peak Freq. Error (Hz) | Estimated Freq. Drift (Hz/s) | Std. of Freq. Drift (Hz/s) |
|---|---|---|---|---|---|
| 750 | 408.54 | 96.08 | 792.85 | 762.65 | 66.60 |
| 1000 | 539.49 | 112.16 | 988.13 | 1020.43 | 92.88 | nfw = 8 (α = 0.0247);
Ne = 5;
$\sigma_e$ = 50 Hz

For the values in Table 6 below, the equivalent averaging window size nfw was set to 4, which provides an exponential averaging coefficient of 0.0488. Also, Ne was set to an average of 200, and $\sigma_e$ was set to 50 Hz.

TABLE 6

| Applied Freq. Drift (Hz/s) | Mean Freq. Error (Hz) | Std. of Freq. Error (Hz) | 4-σ Peak Freq. Error (Hz) | Estimated Freq. Drift (Hz/s) | Std. of Freq. Drift (Hz/s) |
|---|---|---|---|---|---|
| 0 | 0.73 | 24.14 | 97.30 | −0.44 | 17.57 |
| 250 | 78.61 | 24.69 | 177.39 | 249.73 | 18.04 |
| 500 | 155.59 | 25.85 | 258.98 | 500.27 | 18.94 |
| 750 | 235.19 | 26.51 | 341.22 | 749.21 | 19.33 |
| 1000 | 312.74 | 27.92 | 424.43 | 1000.02 | 20.55 | nfw = 4 (α = 0.0488);
Ne = 200 (average);
$\sigma_e$ = 50 Hz

Finally, for the values in Table 7 below, the equivalent averaging window size nfw was set to 4, which provides an exponential averaging coefficient of 0.0488. Also, Ne was set to an average of 5, and $\sigma_e$ was set to 50 Hz.

TABLE 7

| Applied Freq. Drift (Hz/s) | Mean Freq. Error (Hz) | Std. of Freq. Error (Hz) | 4-σ Peak Freq. Error (Hz) | Estimated Freq. Drift (Hz/s) | Std. of Freq. Drift (Hz/s) |
|---|---|---|---|---|---|
| 0 | 0.12 | 77.79 | 311.30 | 0.54 | 43.22 |
| 250 | 80.24 | 84.03 | 416.36 | 249.17 | 45.41 |
| 500 | 154.78 | 89.77 | 513.87 | 502.00 | 49.68 |
| 750 | 234.05 | 91.57 | 600.33 | 750.73 | 52.01 |
| 1000 | 306.57 | 102.49 | 716.51 | 1004.91 | 63.39 | nfw = 4 (α = 0.0488);
Ne = 5;
$\sigma_e$ = 50 Hz

As noted from Tables 2 to 7, the mean frequency errors are the least when the equivalent averaging window size nfw was set to 4, in Tables 6 and 7. Further, it is noted that the standard deviation of the frequency errors depends upon the value of Ne. That is, the standard deviation of the frequency errors decreases with greater frequency offset values per UCP period. Setting nfw equal to 4 produces good results for frequency drifts up to +/−1 KHz/s. Smaller values of nfw result in an exponential average that more closely tracks a changing frequency offset but tends to be more susceptible by noise and less resilient to outlier values, as discussed and illustrated below with reference to FIG. 12. A larger value of nfw, however, may be suitable for situations where frequency errors are less rapidly changing and/or when frequency offset values are noisier (i.e., larger estimation variance) or include large outlier values.

Figure 12:
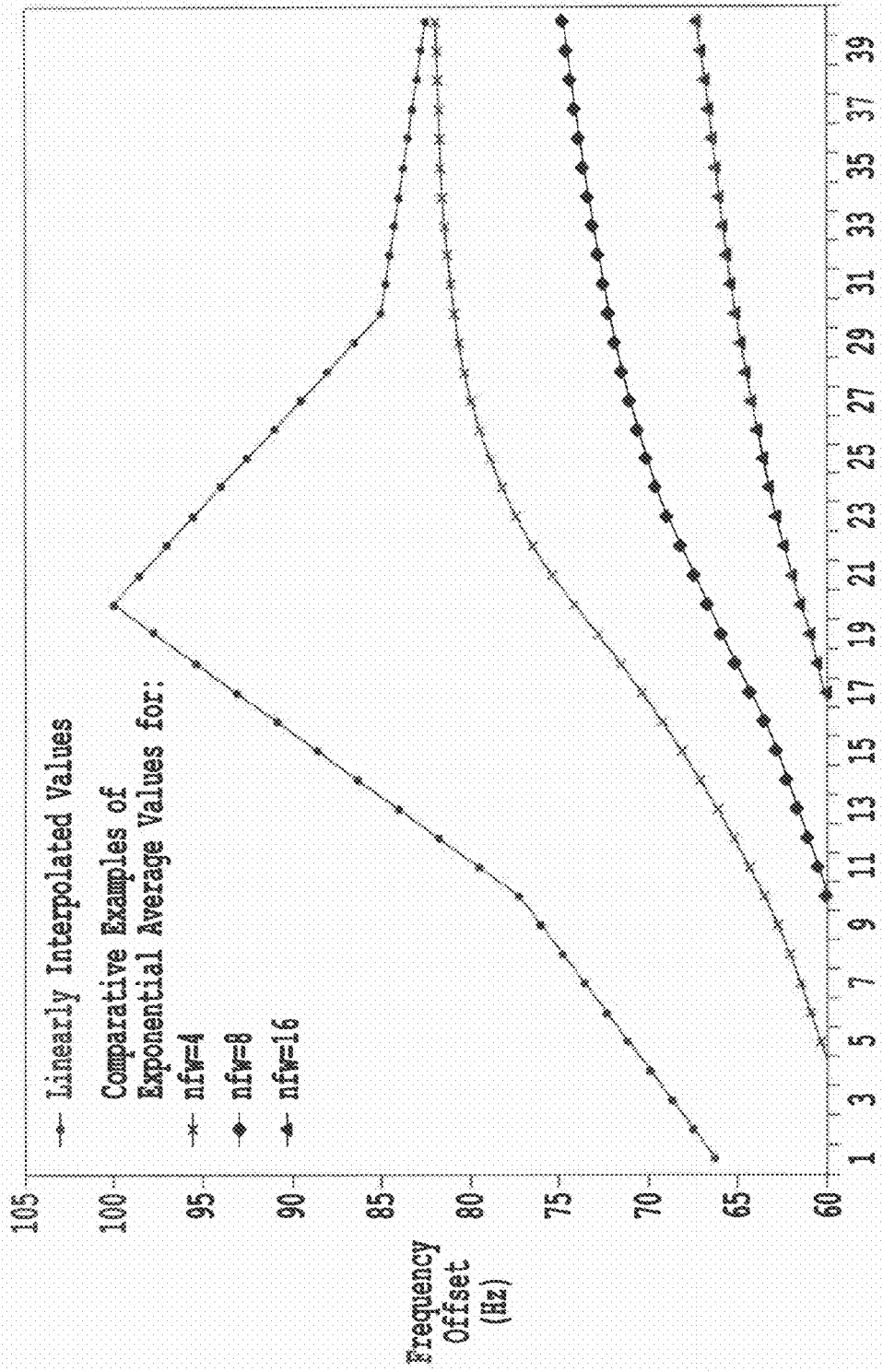
FIG. 12 is a graph illustrating comparative examples of exponential averages for various values of an equivalent moving average window size.

FIG. 12 illustrates a comparative example of exponential averages for equivalent moving average windows nfw of 4, 8, and 16. Based on nfw, a higher value of the exponential averaging coefficient α may discount older interpolated frequency offset values more quickly than a lower value of the exponential averaging coefficient α. Accordingly, as illustrated in FIG. 12, the comparative example for nfw of 8 provides greater weight to older interpolated frequency offset values and varies more slowly in time. Similarly, the comparative example for nfw of 16 may provide an even greater weight to older interpolated frequency offset values than the comparative example for nfw of 8.

Figure 13:
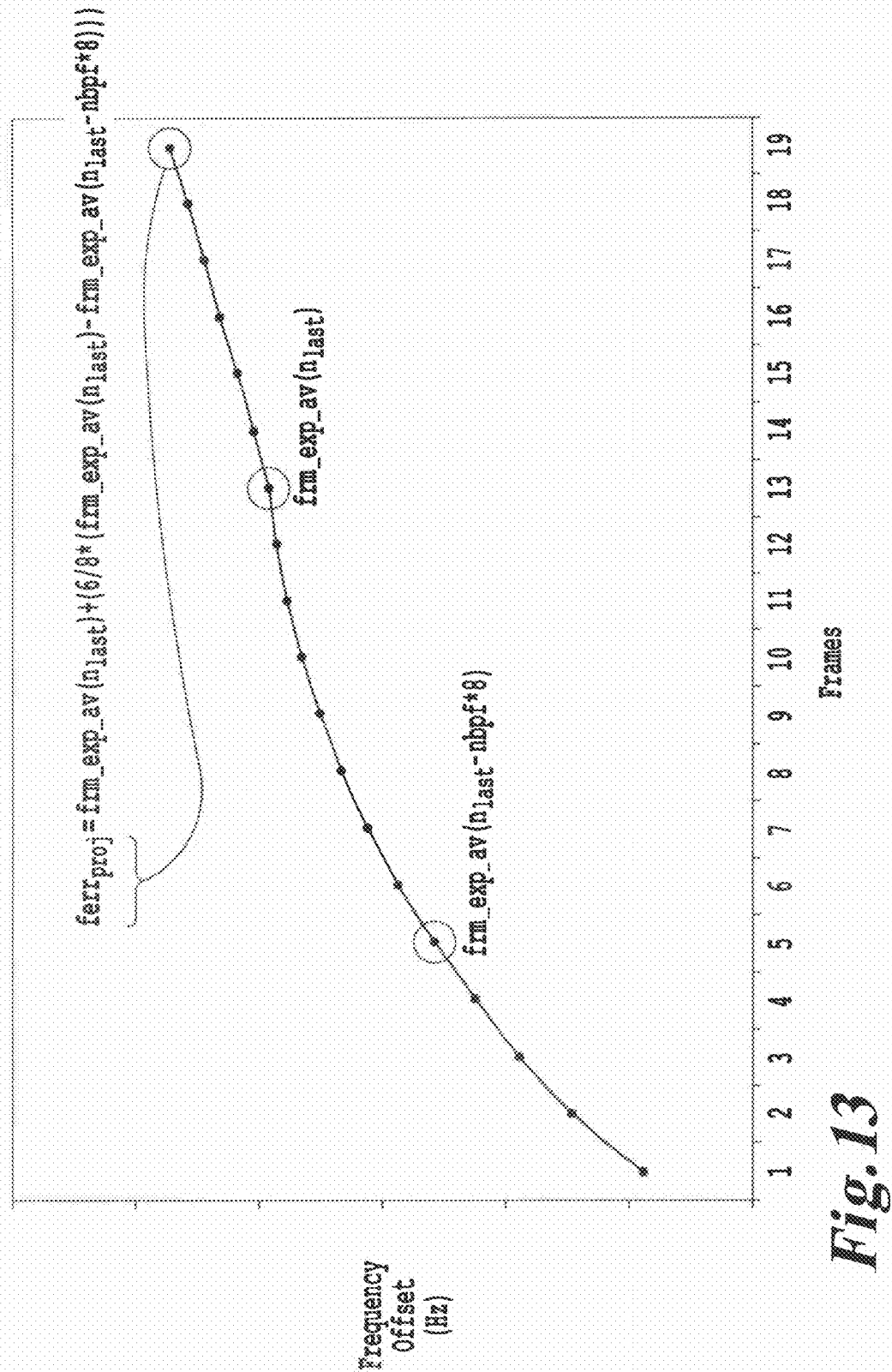
FIG. 13 is a graph illustrating a linearly predicted frequency offset.

With reference to FIG. 13, the linear predicting at step 518 of FIG. 5 is further described, in which the predicted frequency offset $\text{ferr}_{proj}$ is predicted. As illustrated in FIG. 13, the predicted frequency offset $\text{ferr}_{proj}$ is predicted by a linear projection, based on a slope of the frequency difference between a last sample of the exponential average, frm_exp_av($n_{last}$), and a sample of the exponential average p frames before the last sample of the exponential average, frm_exp_av($n_{last}$-nbpf*p). According to the example illustrated in FIG. 12, the predicted frequency offset $\text{ferr}_{proj}$ is determined by a 6-frame linear projection, based on a sample of the exponential average 8 frames before the last sample of the exponential average. Specifically, $\text{ferr}_{proj}$ is determined to the equal to frm_exp_av($n_{last}$) (6/8(frm_exp_av($n_{last}$)-frm_exp_av($n_{last}$-nbpf*8))), according to the equation (5) above. A slope may be determined from the 6-frame linear projection, so that an estimated rate of frequency drift (in Hz per second) and a standard deviation of the estimated rate of frequency drift (in Hz per second) are provided as a product of the linear predicting. In the example above, the predicted frequency offset $\text{ferr}_{proj}$ is predicted according to a 6 frame period of a communications delay between the hub 102 and one of the remotes 104 and 106. However, depending upon the properties of the communications network, $\text{ferr}_{proj}$ may be predicted for values of the communications delay other than 6 frames. The value of $\text{ferr}_{proj}$ may be packaged in a frequency error correction command and transmitted from a hub to a remote, so that the remote may make appropriate adjustments to its transmission carrier frequency based on the value of $\text{ferr}_{proj}$.

Referring back to FIG. 5, the frequency offset correction at step 520 includes synchronizing a carrier frequency source based on the estimated frequency offset or the predicted frequency offset $\text{ferr}_{proj}$. For example, the communication interface 426 may include the hardware and/or software necessary to synchronize a carrier frequency source using locked loop architectures implemented in hardware, software, or combinations of hardware and software, as understood in the art. FIGS. 14-20 are graphs illustrating a simulation of the frequency offset estimation algorithm of the present invention, where the number of frequency offset values per frame Ne/frame was 10 and the equivalent moving average window nfw was 4.

Figure 14:
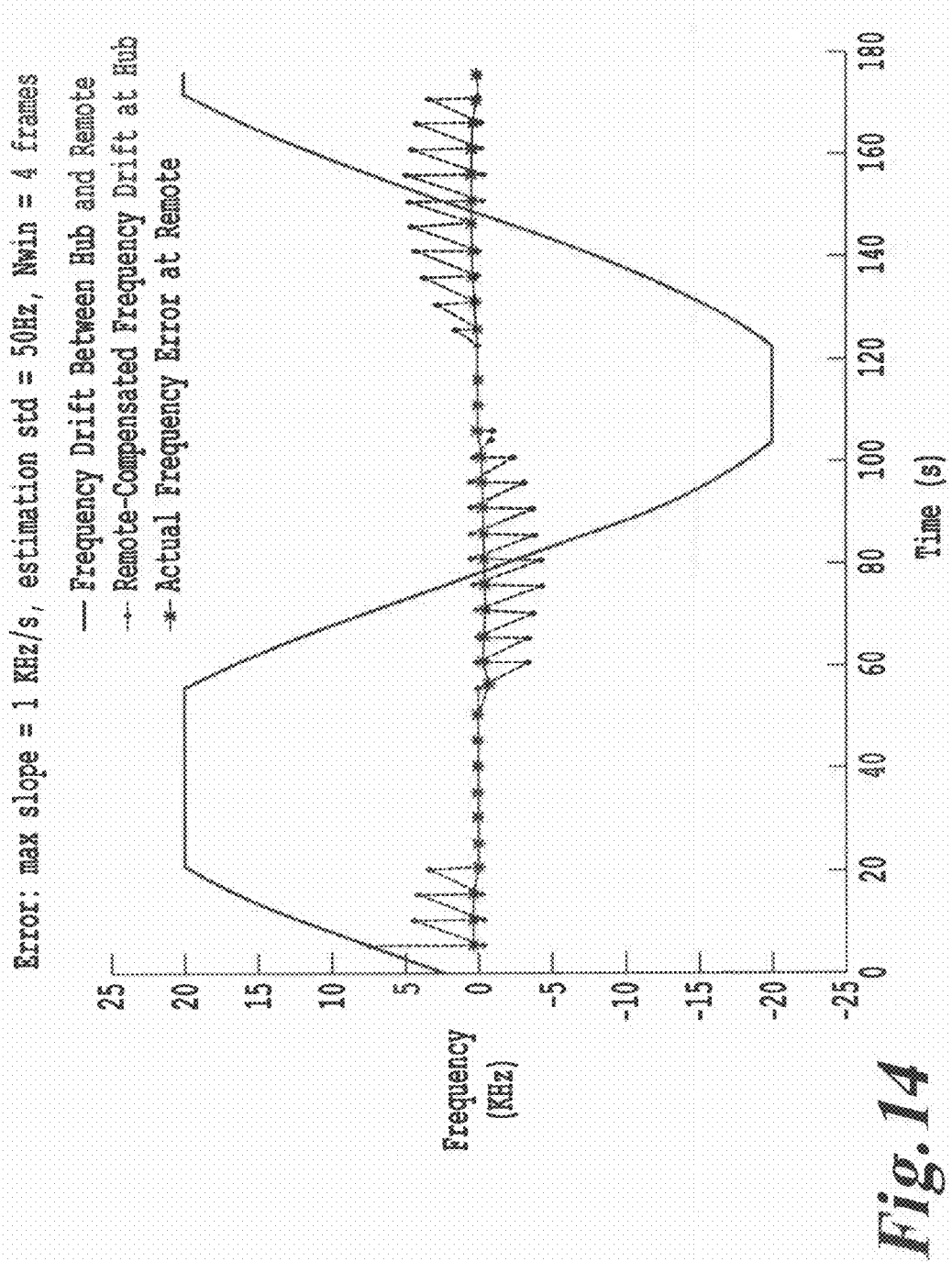
FIGS. 14-19 are graphs illustrating waveforms from a simulation of the frequency offset estimation algorithm of the present invention, for a given set of parameters.

FIG. 14 is a graph illustrating the frequency drift between a hub and a remote over time, the remote-compensated observed frequency drift at the hub over time, and the algorithm-compensated frequency drift at the hub over time. In FIG. 14, the maximum rate of frequency drift between the hub and the remote is 1 KHz per second. The remote-compensated frequency drift represents the frequency drift observed at the hub, while the transmission carrier frequency of the remote is being updated according to frequency correction commands produced each UCP period by the frequency offset estimation algorithm of the present invention. As shown in FIG. 14, the remote-compensated frequency drift is greatly reduced (i.e., approximates 0), each 5 second UCP period. Additionally, the discrete points of frequency error over time represent actual frequency error at the remote, right after the remote compensates for the frequency drift based on the frequency offset estimation and prediction algorithm of the present invention.

Figure 15:
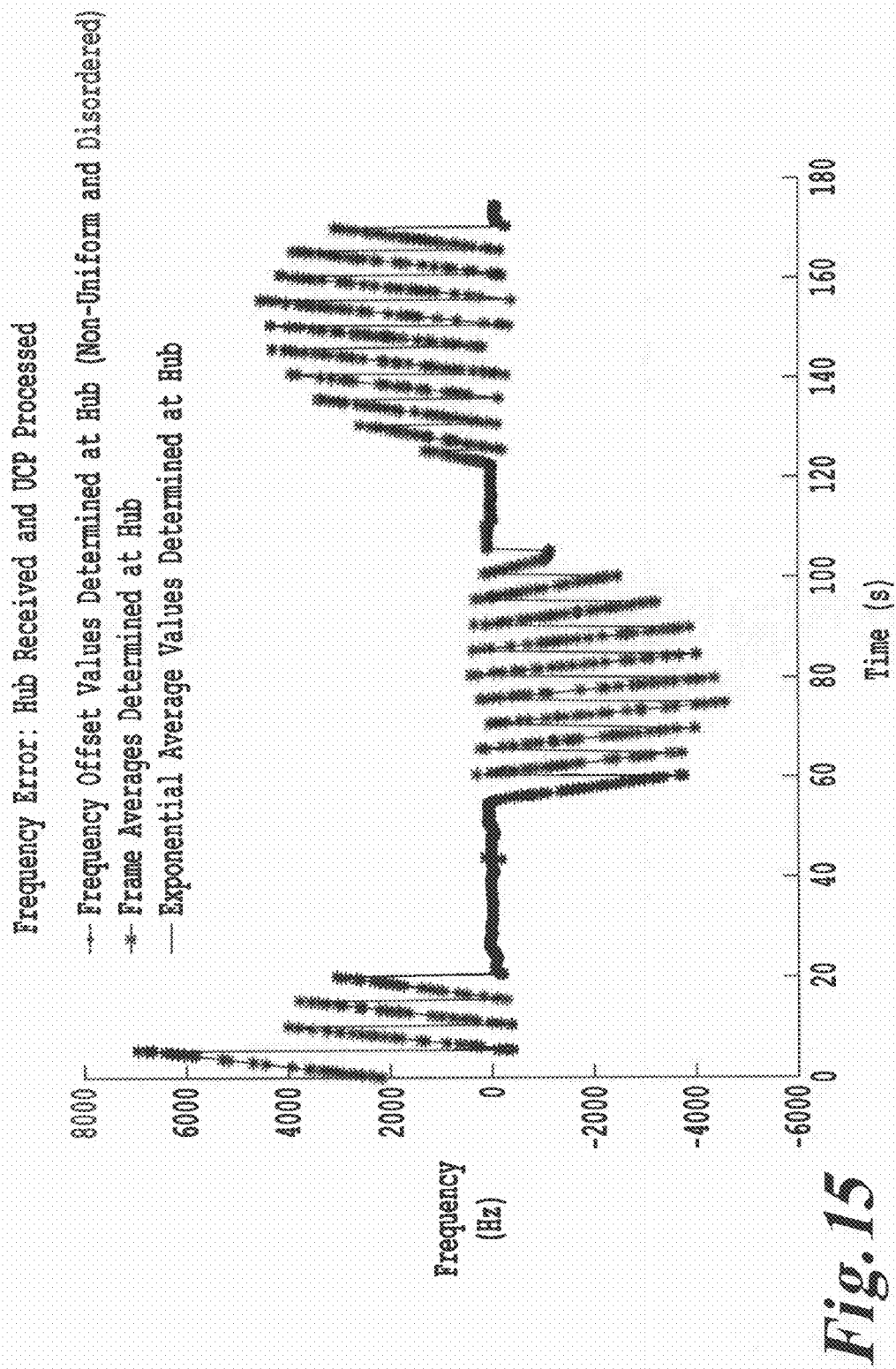

Shifting the scale of the y-axis of FIG. 14 to a reduced range of frequencies, FIG. 15 illustrates, for the same simulation as FIG. 14, non-uniform and disordered frequency offset values determined at the hub, frame averages determined at the hub, and exponential average samples determined at the hub. Further shifting the x-axis and y-axis scales of FIG. 15 to a reduced range of frequencies and time, FIG. 16 illustrates the non-uniform and disordered frequency offset values determined at the hub, the frame averages determined at the hub, and the exponential average samples determined at the hub.

Figure 16:
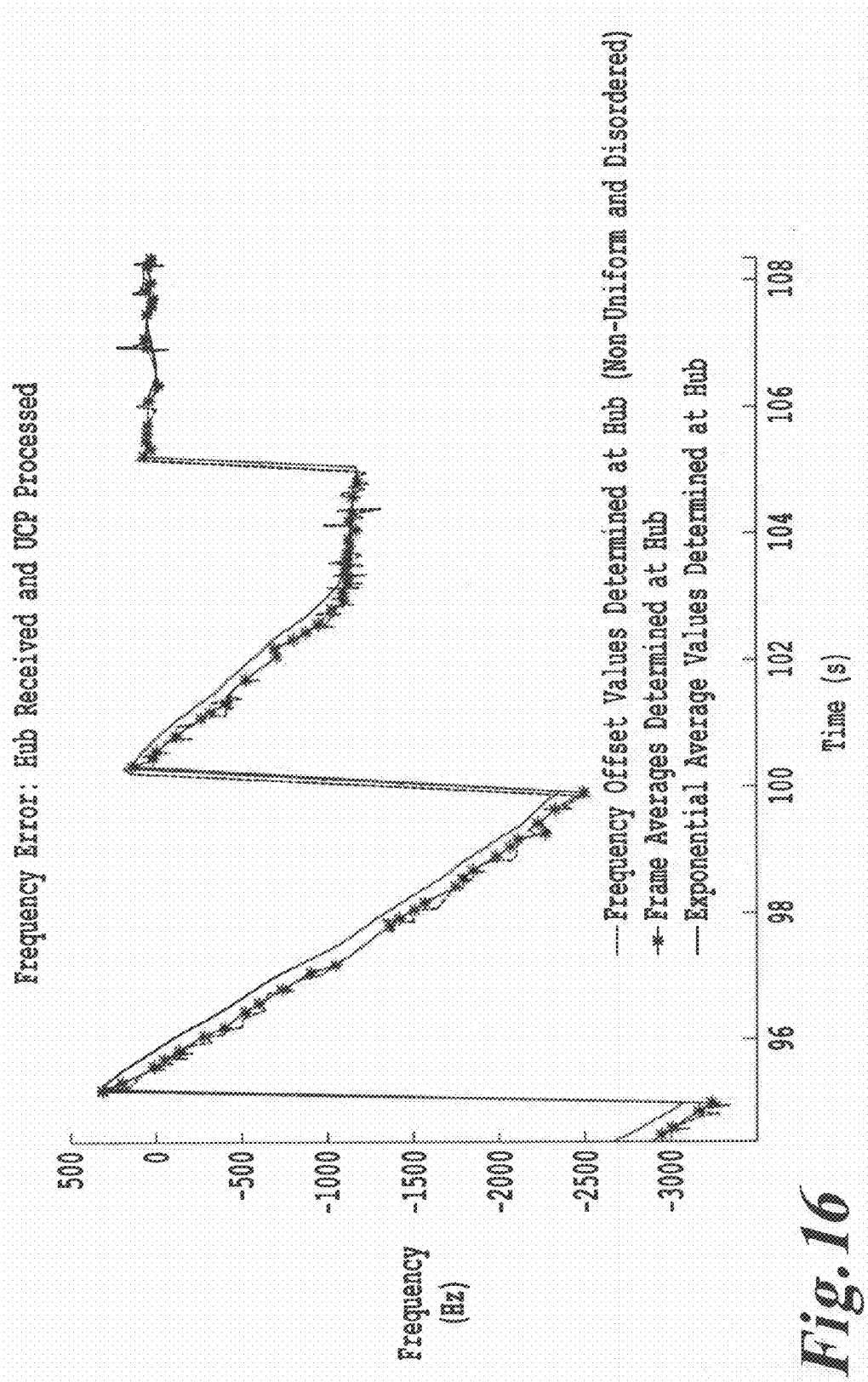

As shown in FIG. 16, the non-uniform and disordered frequency offset values determined at the hub include noise attributed to imprecision in the determination of the frequency offset values at the hub.

Figure 17:
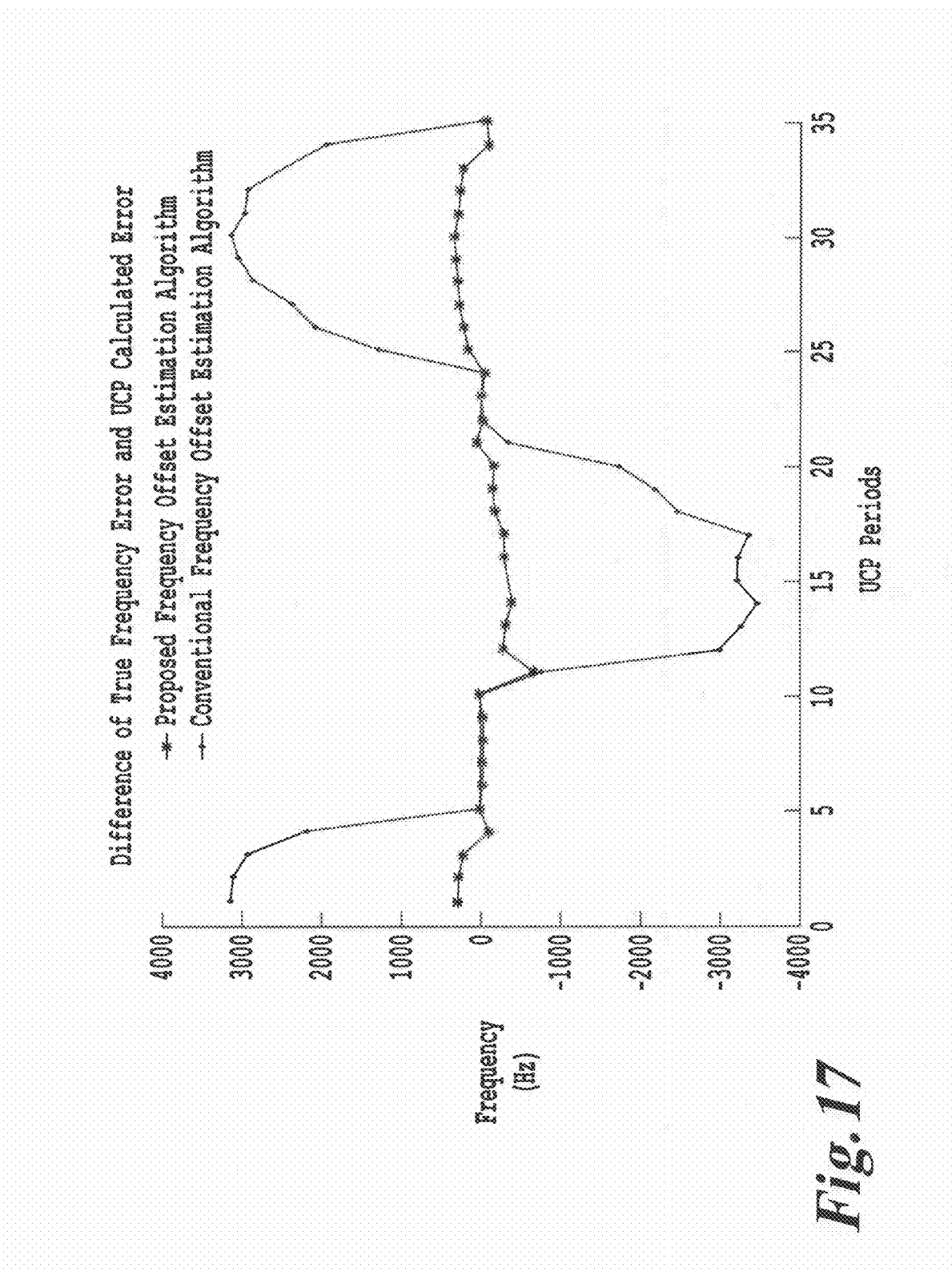

FIG. 17 is a graph illustrating a comparison between the algorithm of the present invention and the conventional simple average method in terms of estimation error (i.e., the difference between the true frequency offset and the estimated frequency offset), at end of each UCP period.

Figure 18:
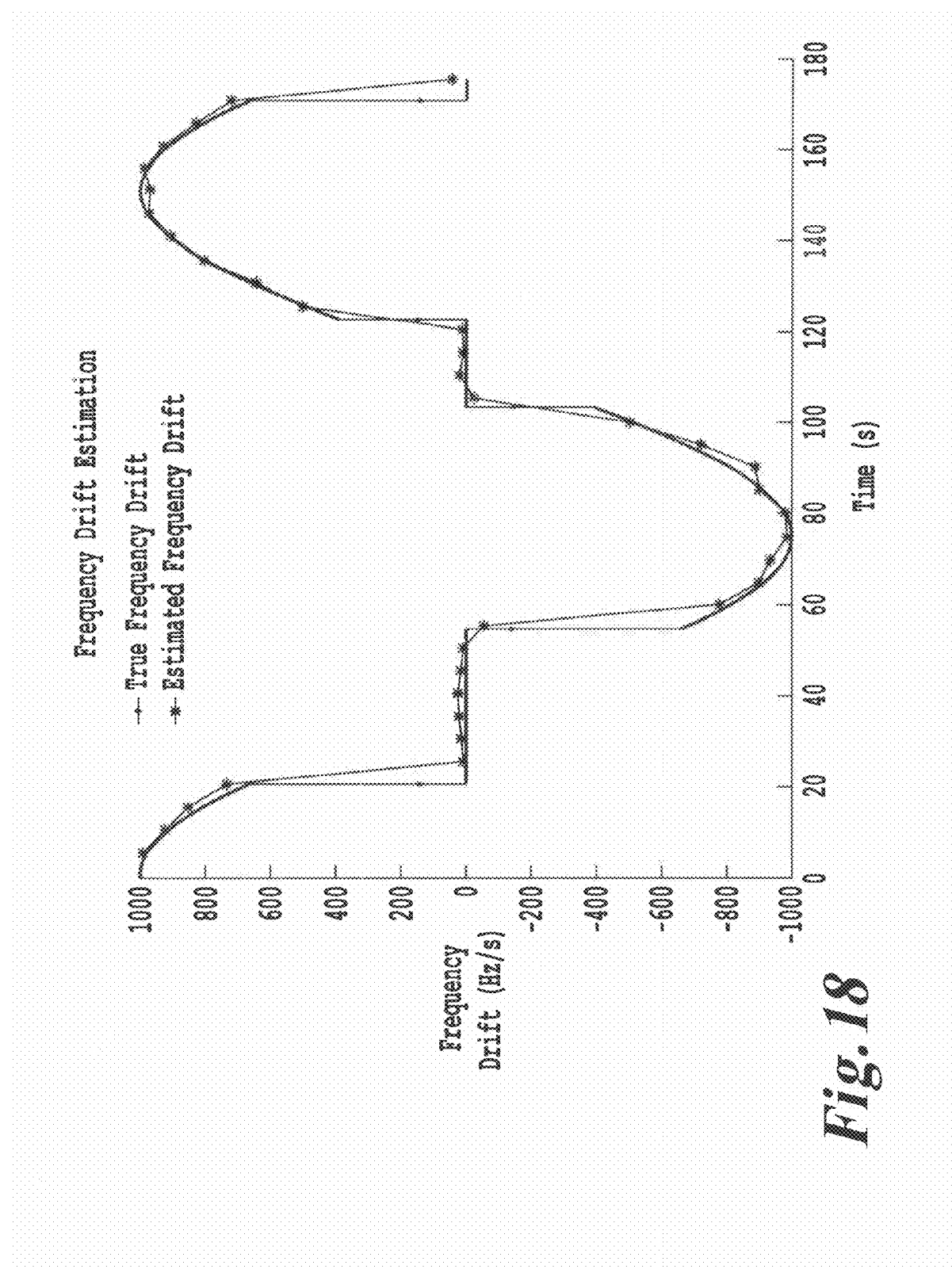

FIG. 18 is a graph illustrating the difference between the estimated frequency drift rate (in Hz/s) estimated by the present invention and the actual total (uncorrected) frequency drift between the hub and the remote, over UCP periods.

Figure 19:
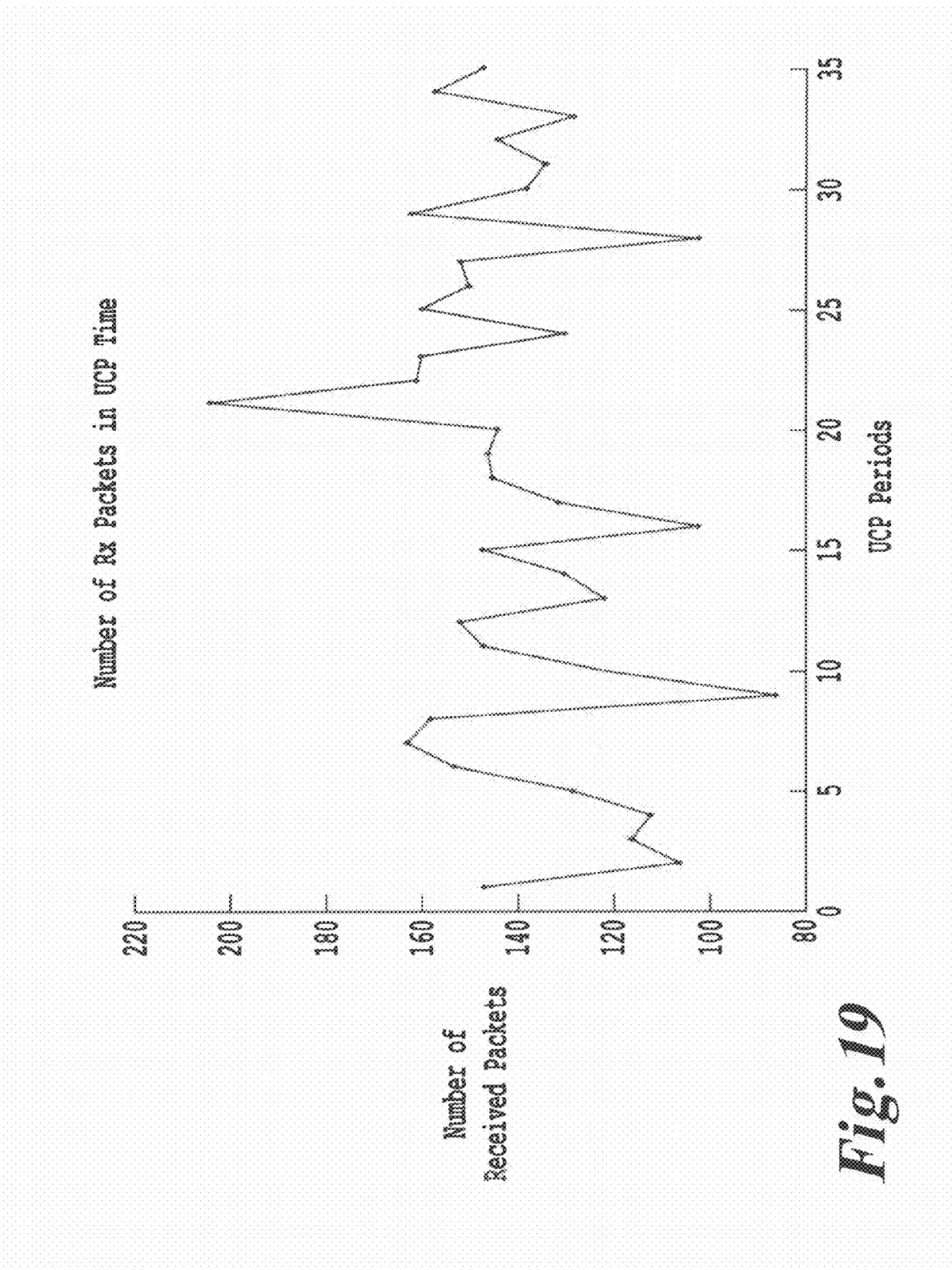
Figure 20:
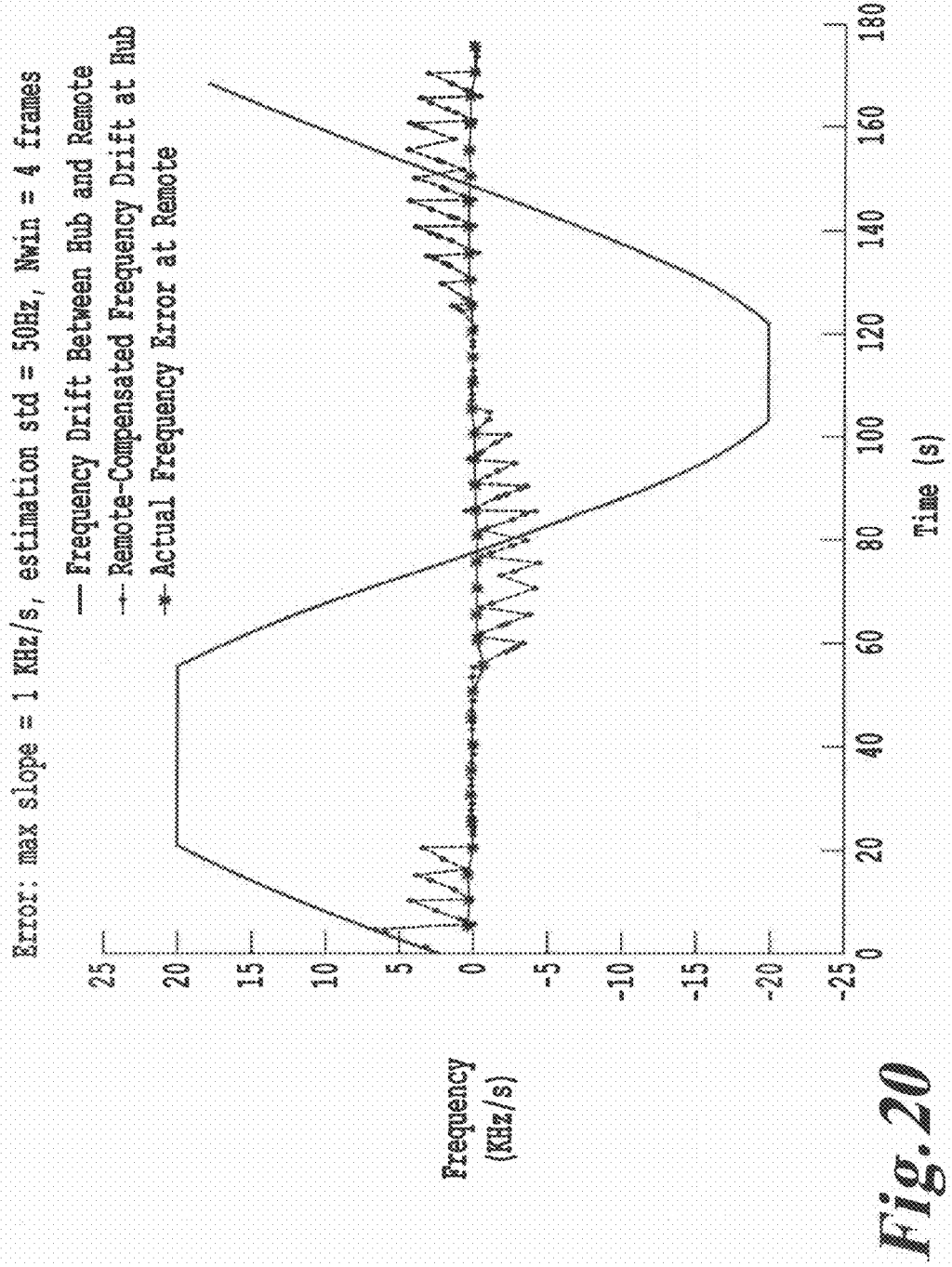
FIGS. 20-23 are graphs illustrating waveforms from a simulation of the frequency offset estimation algorithm of the present invention, for a given set of parameters.
Figure 21:
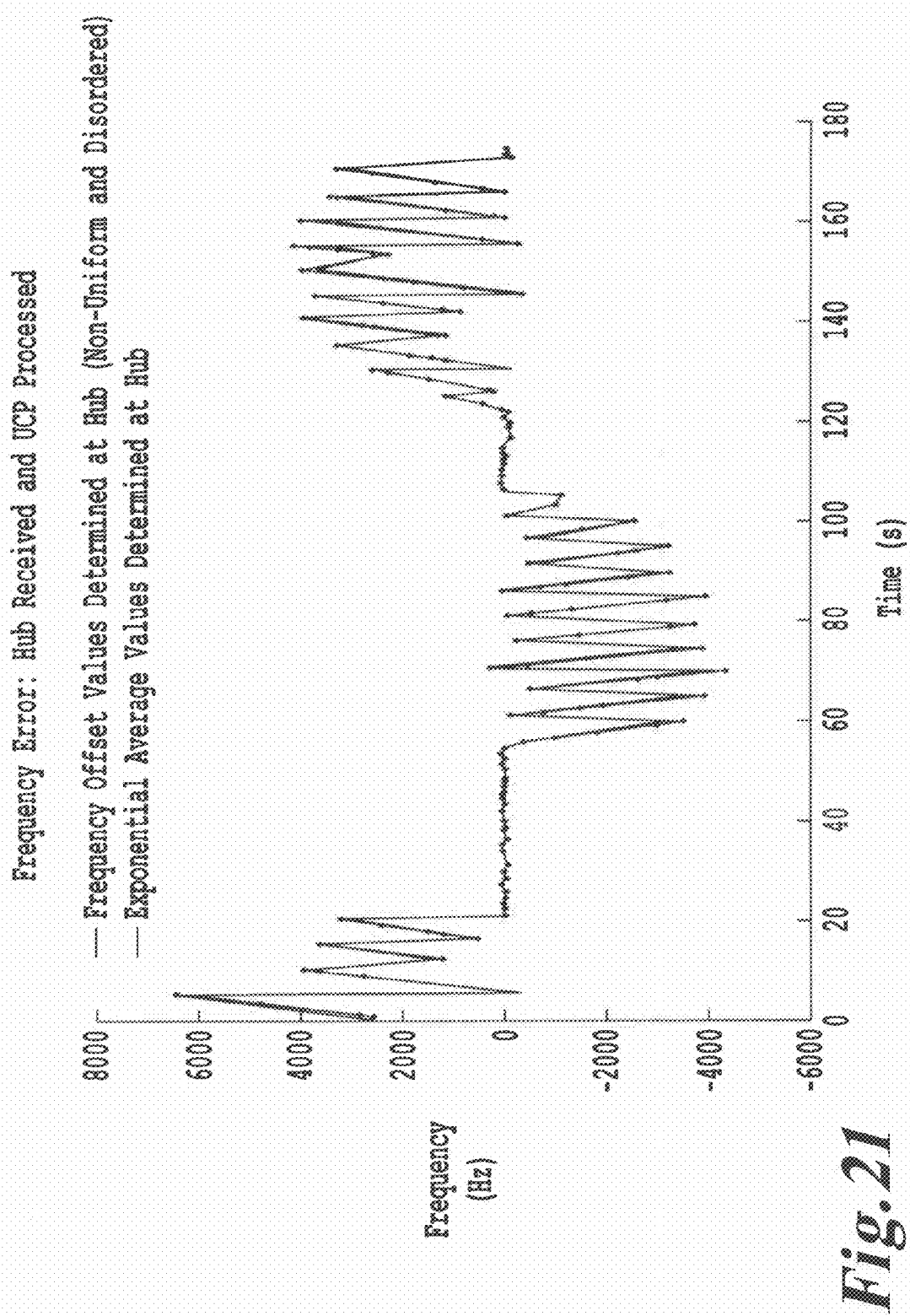
Figure 22:
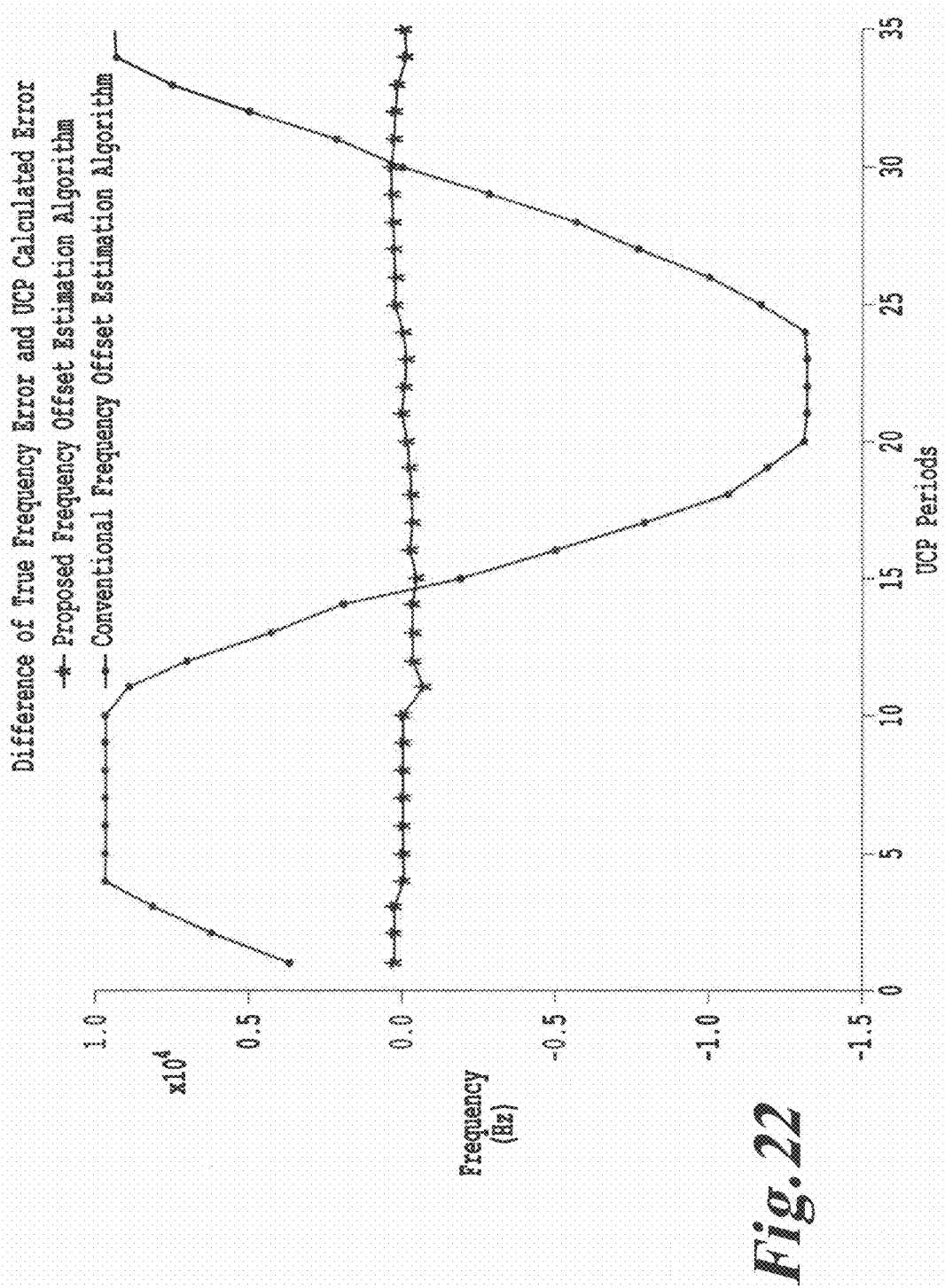
Figure 23:
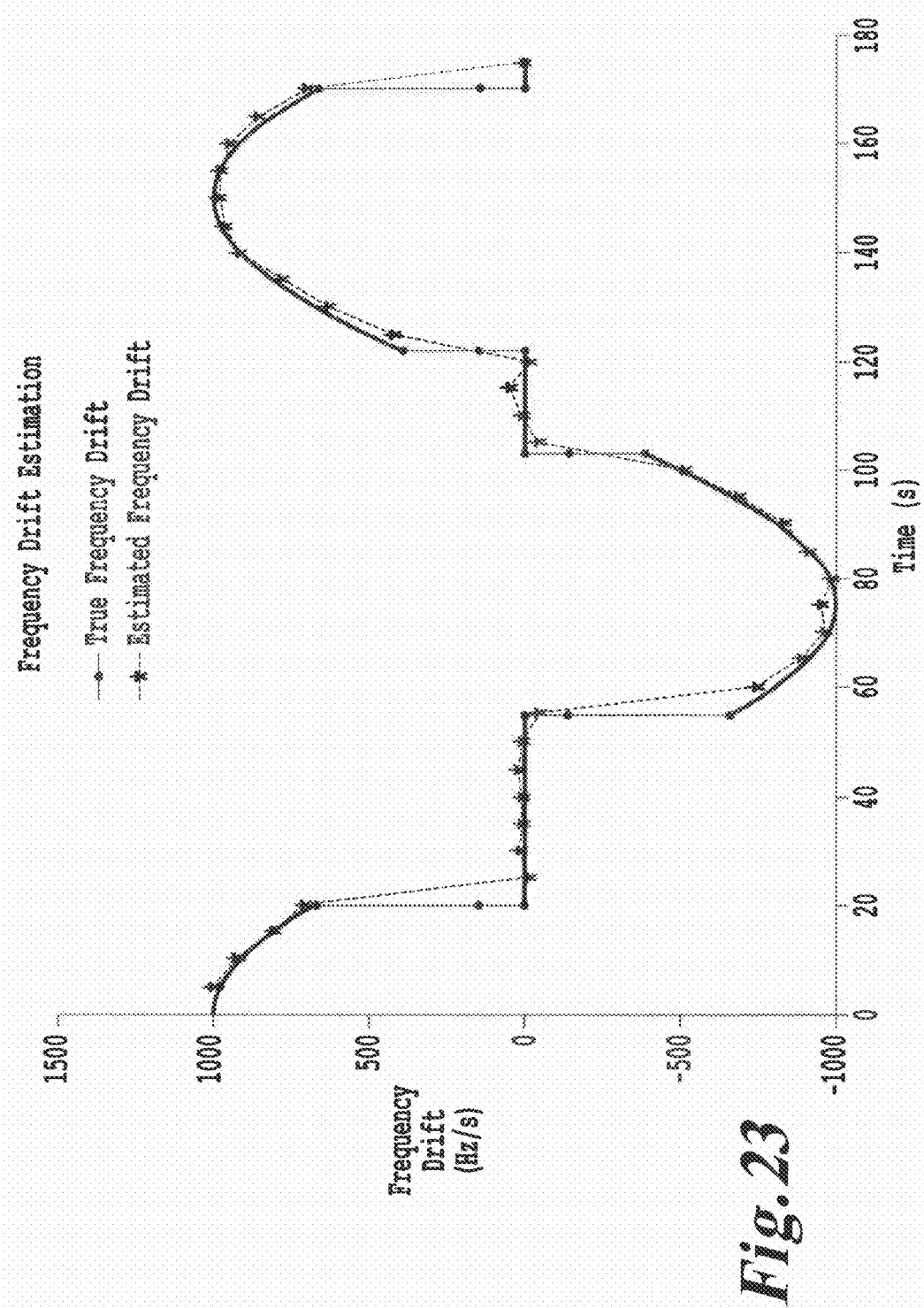
Figure 24:
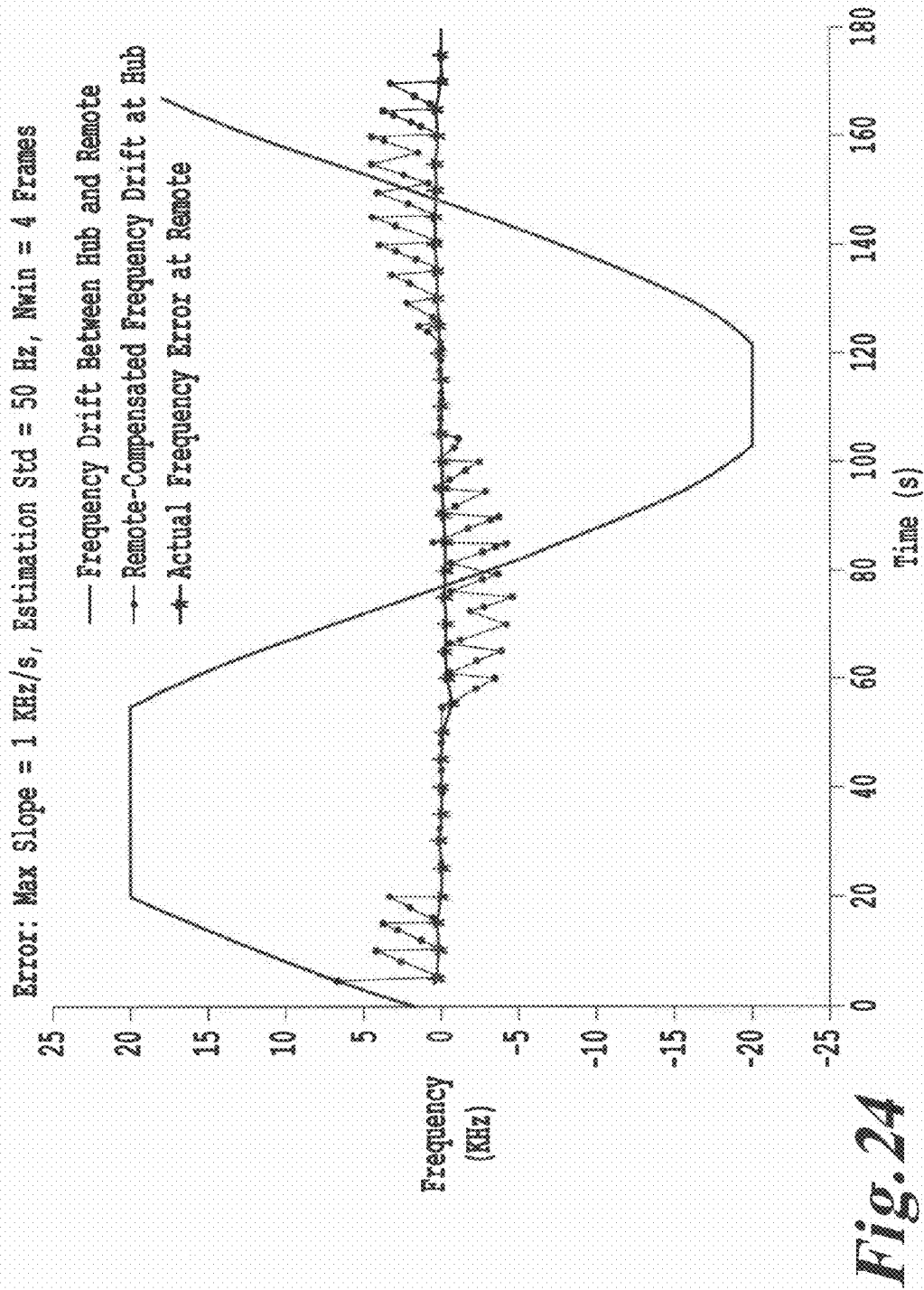
FIGS. 24-27 are graphs illustrating waveforms from a simulation of the frequency offset estimation algorithm of the present invention, for a given set of parameters.
Figure 25:
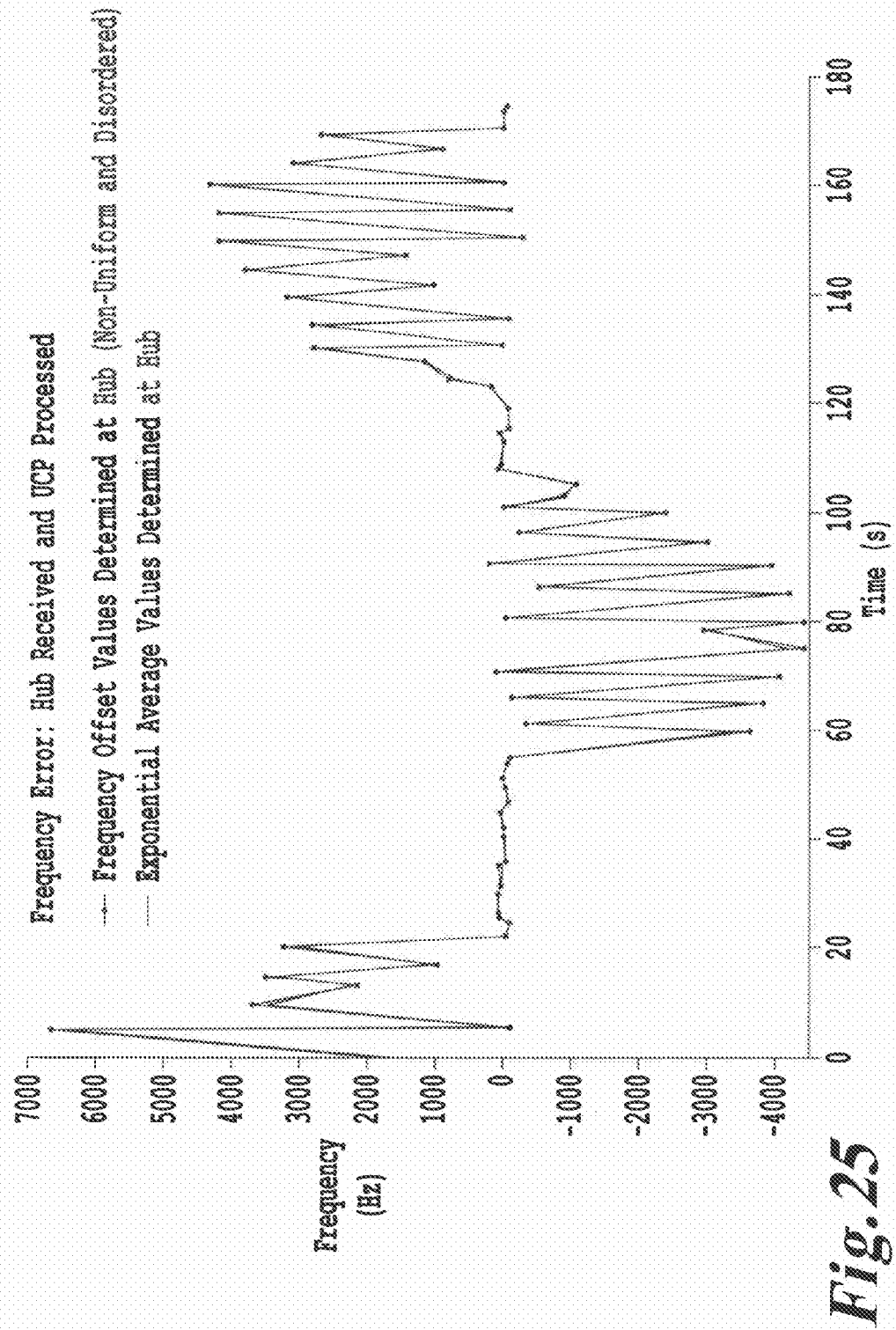
Figure 26:
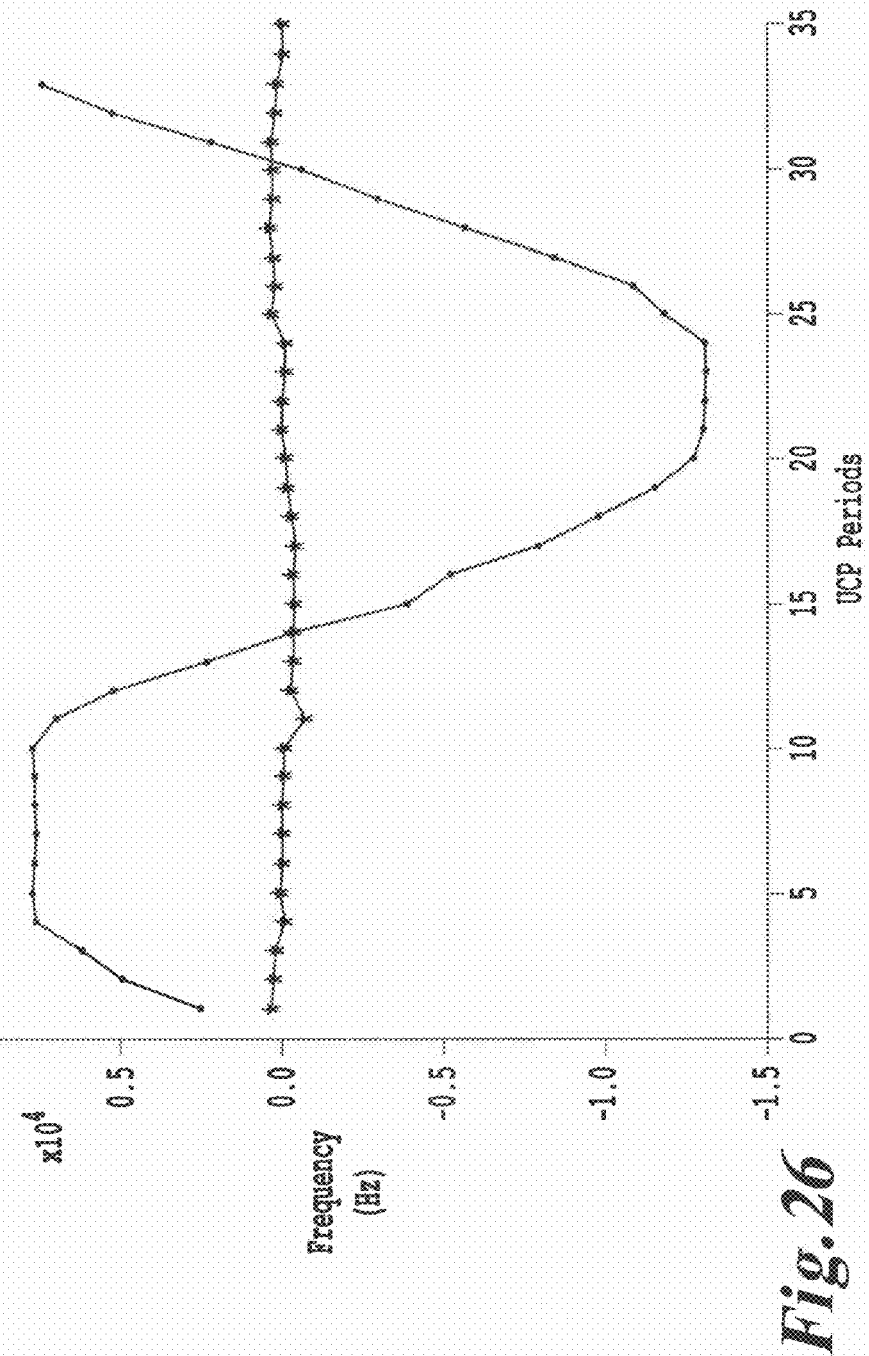
Figure 27:
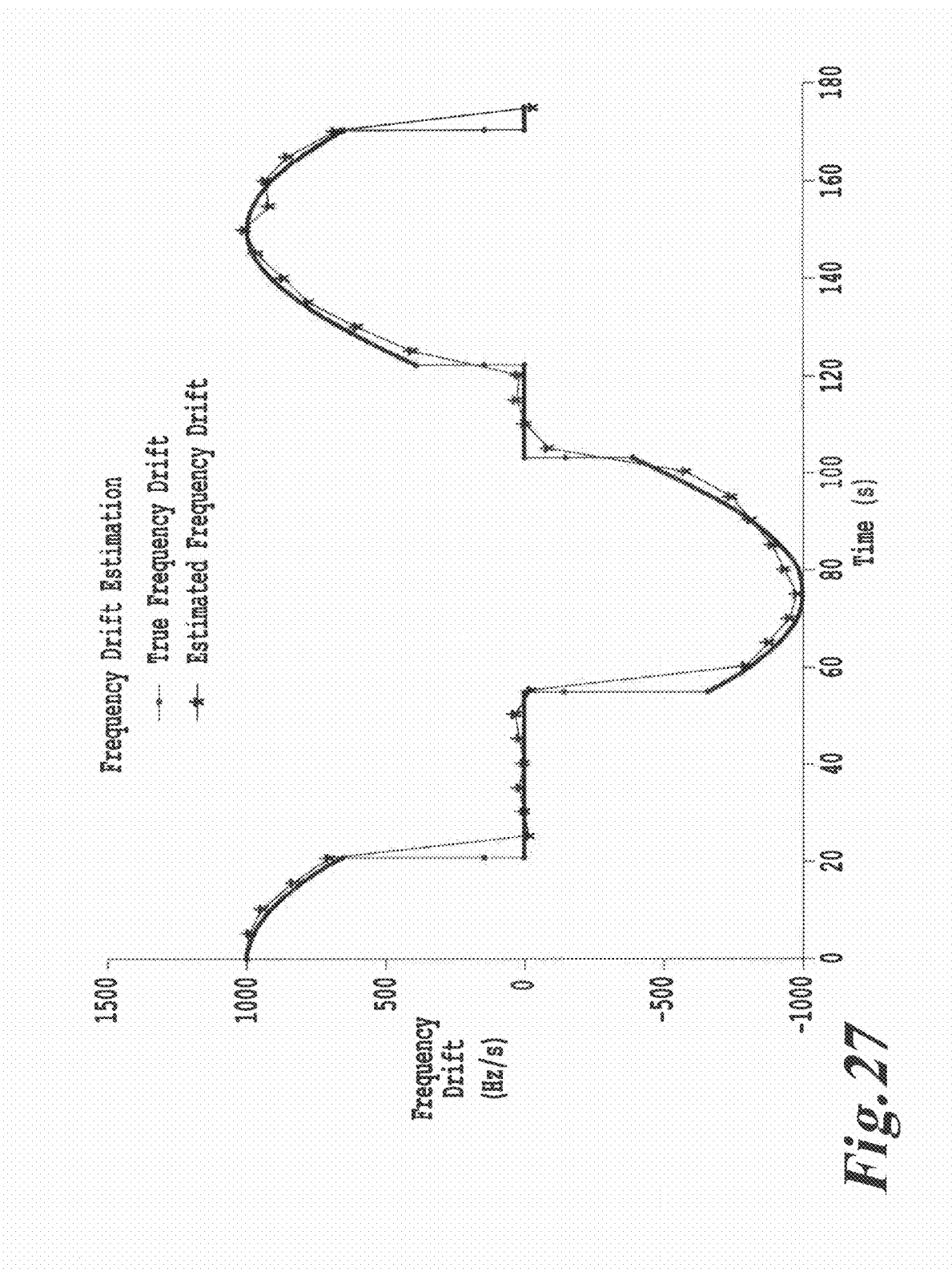
Figure 28:
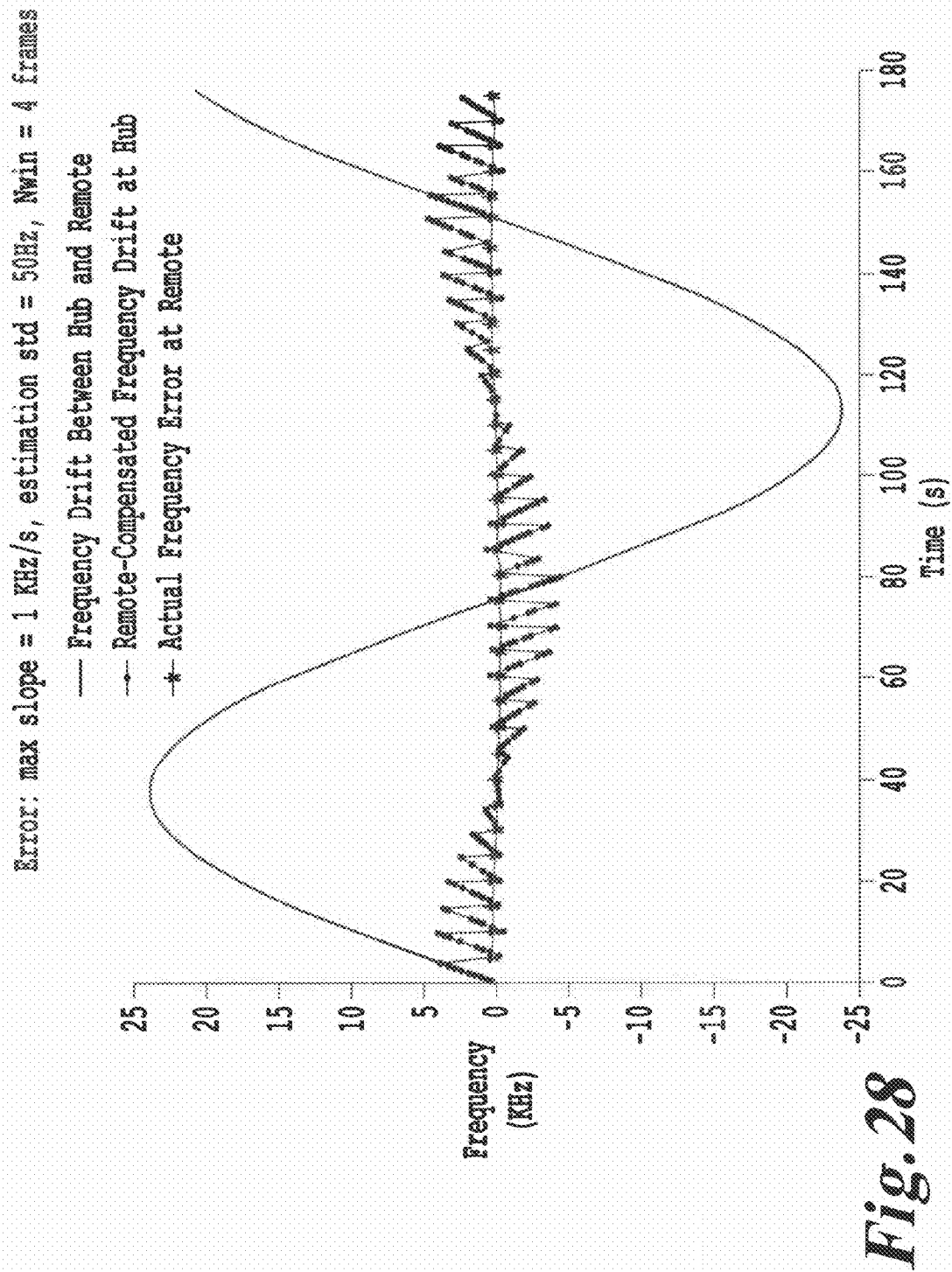
FIGS. 28-33 are graphs illustrating waveforms from a simulation of the frequency offset estimation algorithm of the present invention, for a given set of parameters.
Figure 29:
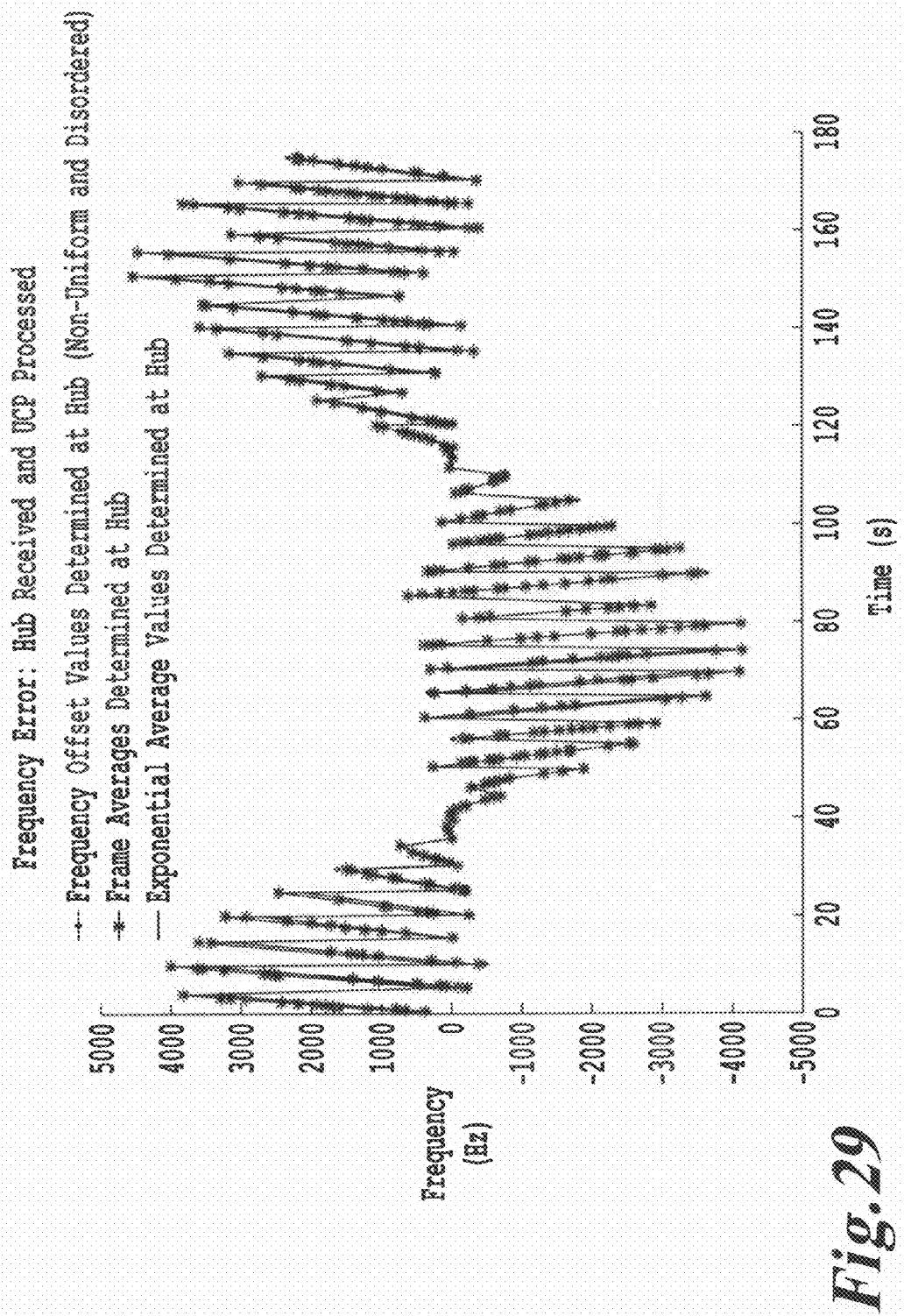
Figure 30:
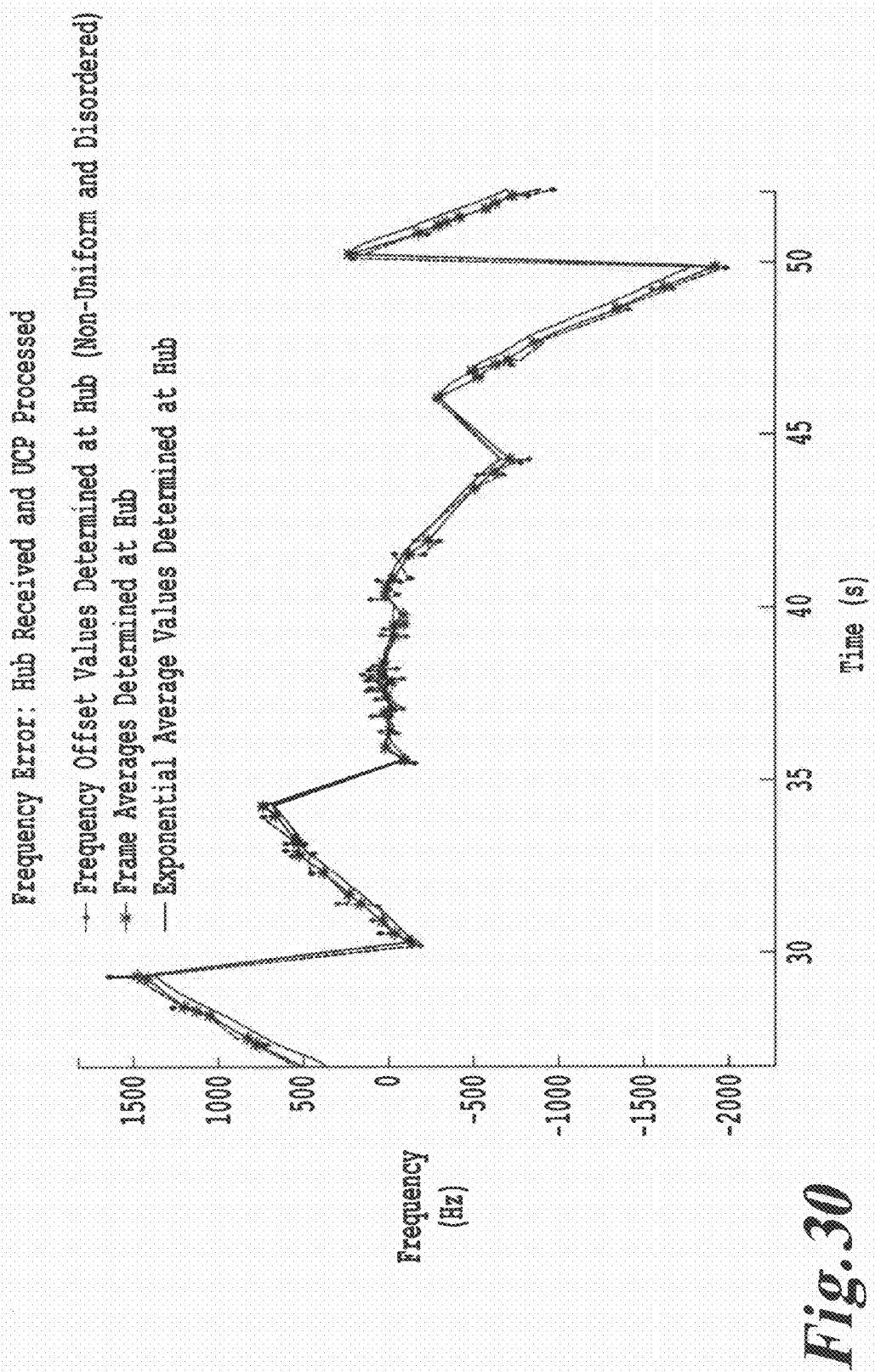
Figure 31:
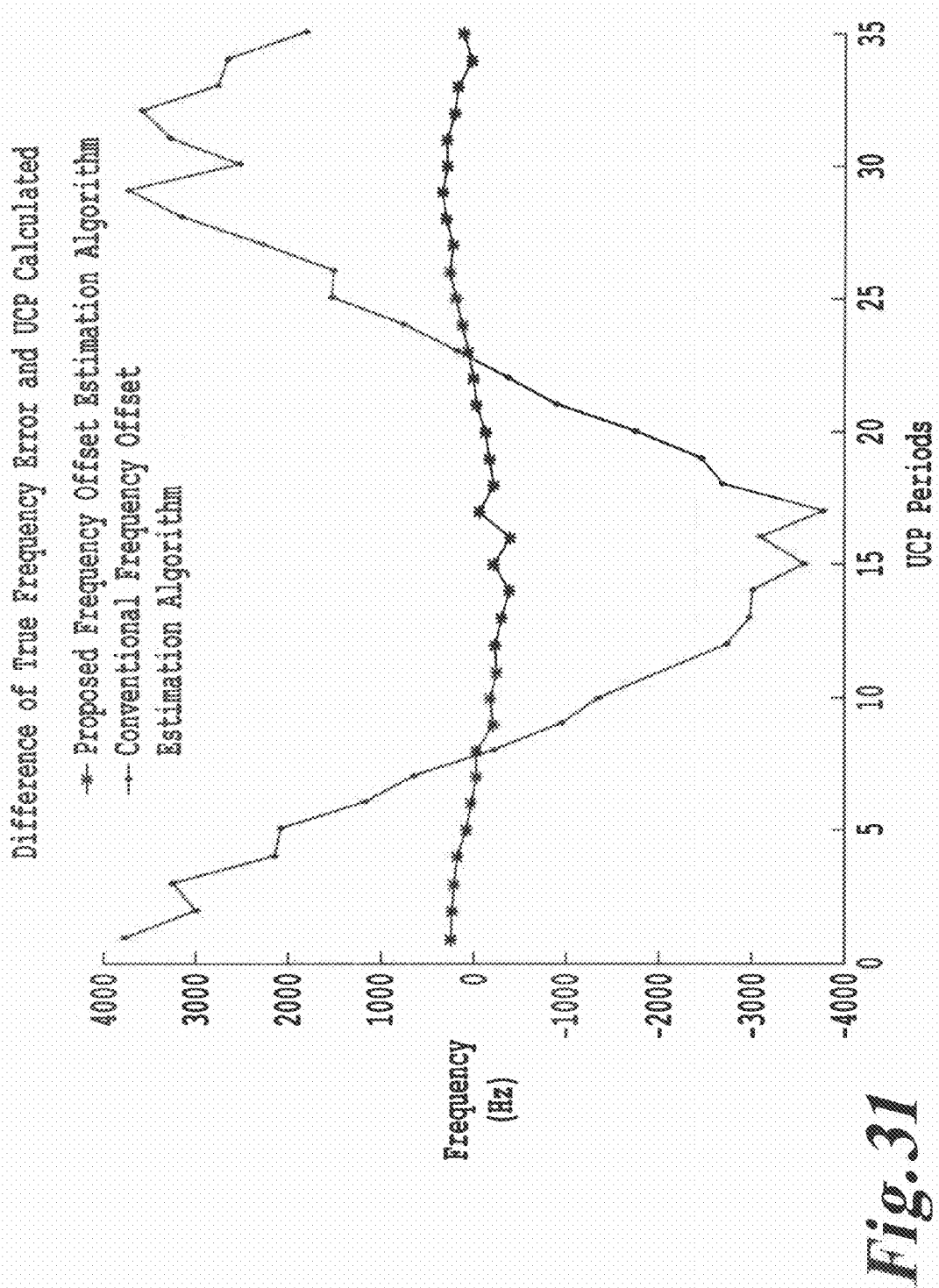
Figure 32:
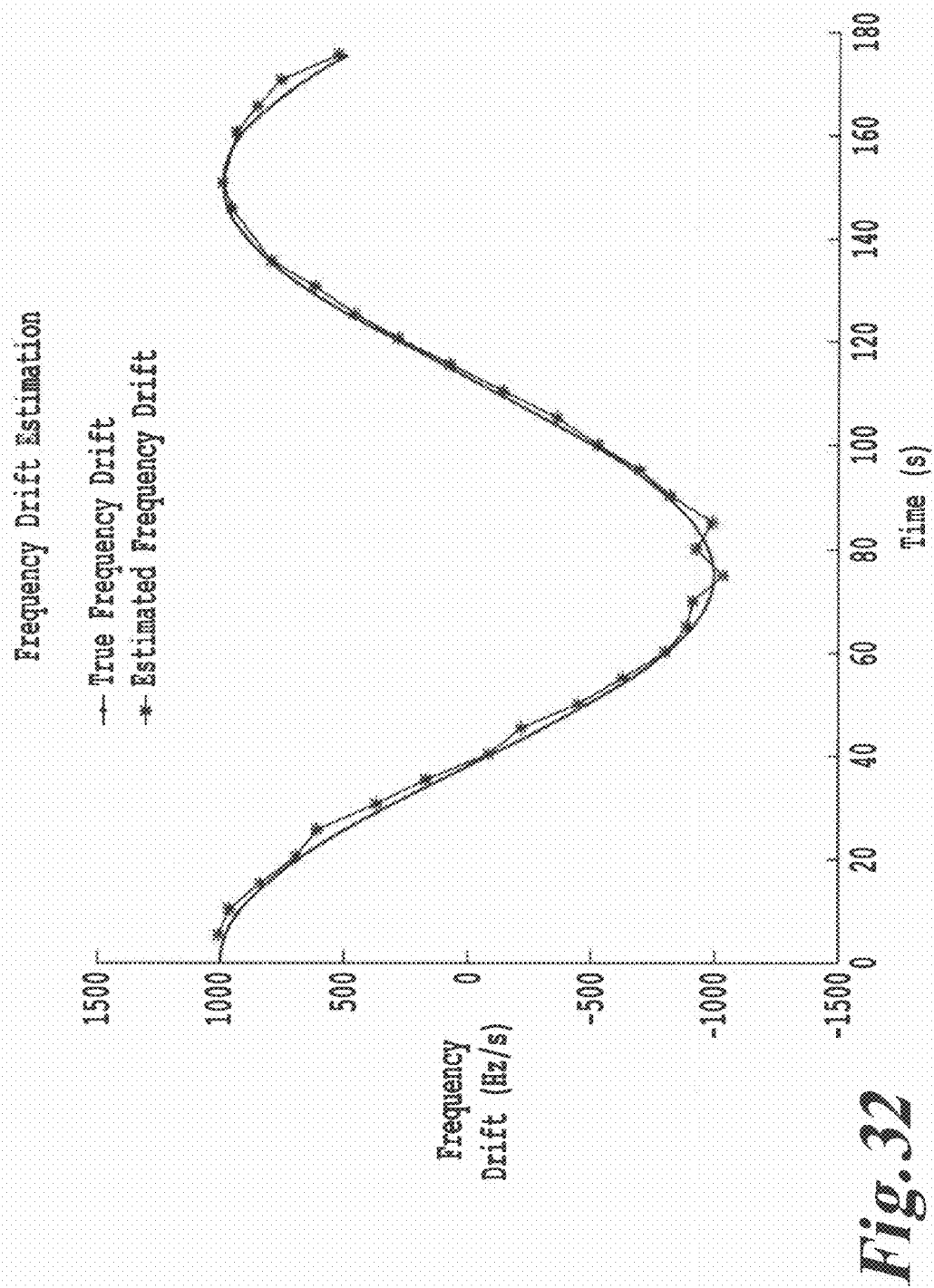
Figure 33:
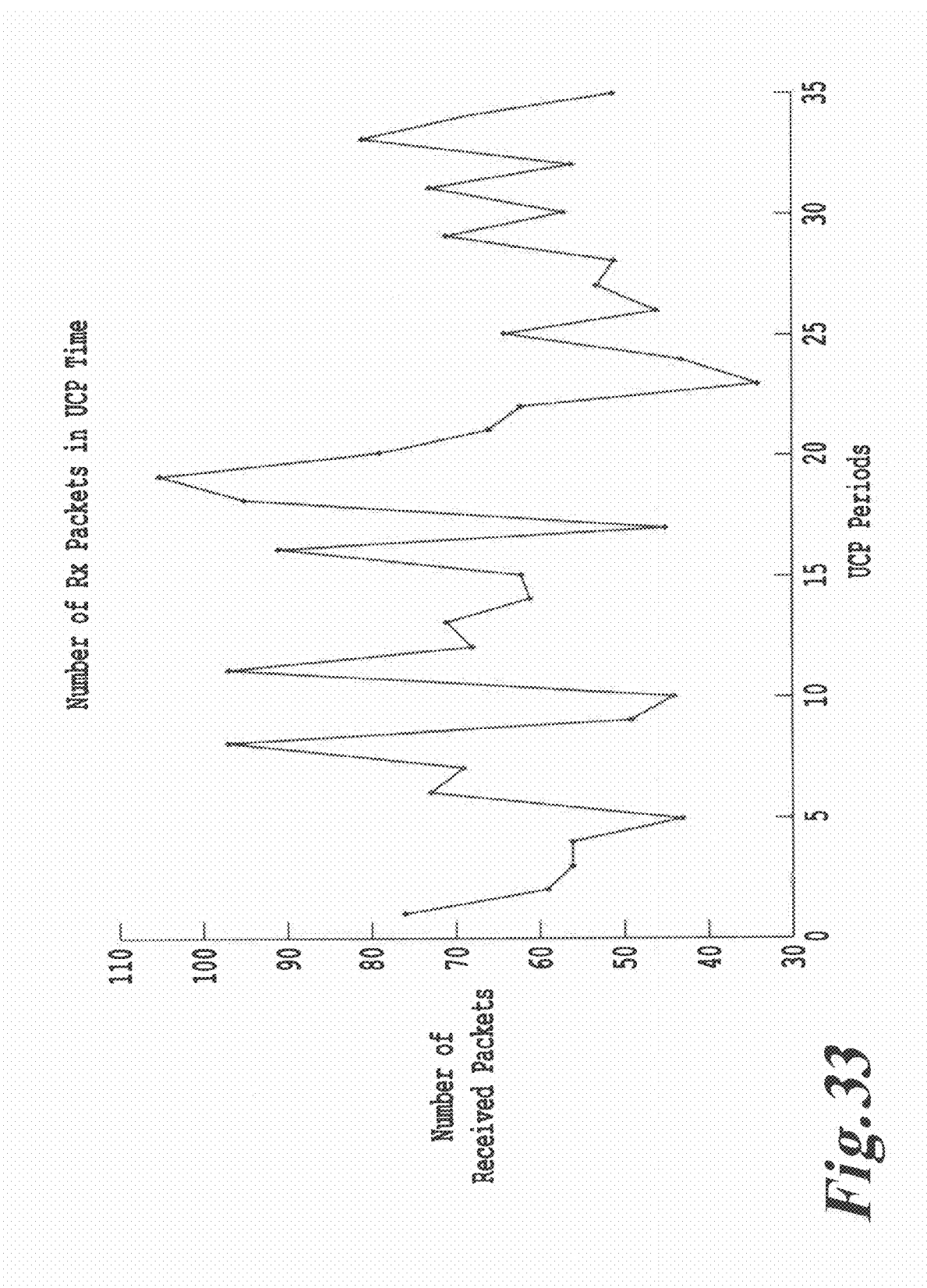

FIG. 19 is a graph illustrating the number of received packets over UCP periods.

FIGS. 20-23 are graphs illustrating a simulation of the frequency offset estimation algorithm of the present invention, where the number of frequency offset values per UCP period Ne/UCP was set as 5 and the equivalent moving average window nfw was set as 4. The waveforms illustrated in FIGS. 20-23 are analogous to those respectively illustrated in FIGS. 14 and 16-18.

FIGS. 24-27 are graphs illustrating a simulation of the frequency offset estimation algorithm of the present invention, where the number of frequency offset values per UCP period Ne/UCP was set as 3 and the equivalent moving average window nfw was set as 4. The waveforms illustrated in FIGS. 24-27 are analogous to those respectively illustrated in FIGS. 14 and 16-18.

FIGS. 28-33 are graphs illustrating a simulation of the frequency offset estimation algorithm of the present invention, where the number of frequency offset values per frame Ne/frame was set as 10, the equivalent moving average window nfw was set as 4, and a sinusoidal frequency drift was considered. The waveforms illustrates in FIGS. 28-33 are analogous to those respectively illustrated in FIGS. 14-19.

In summary, the frequency offset estimation apparatus, method, and system of the present invention can reliably track frequency errors at a drift rate of at least 1 KHz/s. Tracking error is a function of, at least, the exponential averaging coefficient (the larger coefficient, the larger the error and the smaller the estimation variance). Performance is determined by the peak error which is approximated by the mean error plus 4 times the standard deviation of the UCP estimation error. Specifying a maximum frequency drift, $f_{drift}$, that can be tolerated by a demodulator of a hub as 1 KHz/s, the upper limit of the frequency error within a UCP period should be no more than $f_{drift}$ times the number of seconds in a UCP, $t_{UCP}$, or 5 KHz for a UCP duration of 5 s. To accommodate a lower frequency drift rate of 800 Hz/s with a reasonable margin, the equivalent window size should be no more than 8 frames according to the simulation results in Table 2 through Table 7. One choice for the equivalent averaging window size nfw is 4 frames, which allows a maximum drift rate of (5000−716)/5≈857 Hz/s. More specifically, setting nfw to a value of 4 provides a compromise between tracking speed and estimation variance. It allows fast tracking of the frequency drift up to +/−1 KHz/s while sufficiently smoothing out noisy and outlier frequency offset estimate values.

The frequency offset estimation and correction apparatus, method, and system of the present invention is designed to operate suitably, even if a number of available estimates from the remote drops to 3. In a usual case, when the number of received estimates is much higher than 5, which is the minimum number for the 'keep alive' mode, the algorithm produces good results even for very noisy frequency offset values. This can be seen from the graphs of FIGS. 28-33, where the standard deviation for short term frequency stability is 200 Hz. Here, short term frequency stability is considered as a random Gaussian process having a standard deviation or sigma of 200 Hz. In other words, in the examples of FIGS. 28-33, there is a 0.997 probability that a frequency is within a range of +/−3 sigma (i.e., +/−600 Hz) of its nominal value.

Further, the frequency offset estimation and correction apparatus, method, and system of the present invention combines the re-sequencing, frame averaging, and re-sampling with a low-complexity and flexible exponential average, to achieve both low complexity and flexibility of implementation. Additionally, re-sampling may be combined with a simple moving average, having performance that is similar to the exponential average described above. Depending on the average window size and the re-sampling granularity, a simple moving average may require a large memory for the moving average (as opposed to just a single sample memory used by the exponential average). In terms of computational complexity, the combined re-sequencing, frame averaging, re-sampling, and exponential averaging requires merely 3 multiplications and 3 additions for each interpolated sample. It can be further reduced to just 1 multiplication and 4 additions per interpolated sample for some average window sizes, which is far less complex than a conventional FIR filer re-sampler in terms of both memory requirement and computational complexity.

Variations of the frequency offset estimation apparatus, method, and system described above are possible in light of the above description. Thus, the frequency offset estimation apparatus, method, and system described above may be practiced other than as specifically described, based on art recognized equivalents understood by those having ordinary skill in the art.

The invention claimed is:

1. A frequency offset estimation and correction apparatus, comprising:
    a frame averaging unit to average, for each of a plurality of frames, a plurality of frequency offset values to obtain a frame offset average for each of the plurality of frames;
    a re-sampling unit to produce, for each of the plurality of frames, a plurality of interpolated frequency offset values uniformly distributed over a time period of a frame of the plurality of frames based on the frame offset average of the frame and a frame offset average of at least one frame that precedes the frame; and
    an exponential averaging unit to calculate an estimated frequency offset based on the plurality of interpolated frequency offset values weighted by an exponential averaging coefficient.

2. The apparatus of claim 1, wherein the frame averaging unit further comprises:
    a frame sequencing unit to sequence the plurality of frequency offset values to produce sequenced frequency offset values based on sequence numbers in received bursts; and
    a frame averaging unit to average the sequenced frequency offset values to obtain the frame offset average of each frame.

3. The apparatus of claim 2, wherein the frame sequencing unit is further configured to sequence the plurality of frequency offset values among N-frame blocks based on the sequence numbers in received bursts.

4. The apparatus of claim 1, wherein the exponential averaging unit is further configured to determine a current sample of the estimated frequency offset based on a current interpolated frequency offset value, a previous sample of the estimated frequency offset, and the exponential averaging coefficient.

5. The apparatus of claim 1, further comprising:
    a linear prediction unit to determine a predicted frequency offset based on the estimated frequency offset and a communications delay between a communications hub and a remote communications unit, the predicted frequency offset including a frequency offset predicted for a time period of the communications delay between the communications hub to the remote communications unit.

6. The apparatus of claim 5, further comprising:
    a frequency offset correction unit to synchronize a carrier frequency source based on the predicted frequency offset.

7. The apparatus of claim 1, wherein the exponential averaging coefficient is determined according to a number of frames of an equivalent moving average window and a number of the plurality of interpolated frequency offset values or number of bursts per frame.

8. The apparatus of claim 7, wherein
the exponential averaging coefficient is determined as $$\alpha = \frac{2}{nfw \cdot nbpf + 1},$$

where α is the exponential averaging coefficient, nfw is the number of frames of the equivalent moving average window, and nbpf is the number of the plurality of interpolated frequency offset values or number of bursts per frame.

9. The apparatus of claim 8, wherein the moving average window size is 4 frames and the number of the plurality of interpolated frequency offset values per frame is 10.

10. A hub unit comprising the frequency offset estimation and correction apparatus of claim 1.

11. A frequency offset estimation and correction method, comprising:
    averaging, for each of a plurality of frames, a plurality of frequency offset values to obtain a frame offset average for each frame;
    producing, for each of the plurality of frames, a plurality of interpolated frequency offset values uniformly distributed over a time period of the frame based on the frame offset average of the frame and a frame offset average of at least one previous frame; and
    calculating the estimated frequency offset based on the plurality of interpolated frequency offset values weighted by an exponential averaging coefficient.

12. The method of claim 11, further comprising:
sequencing the plurality of frequency offset values to produce sequenced frequency offset values based on sequence numbers in received bursts; and
averaging the sequenced frequency offset values to obtain the frame offset average of each frame.

13. The method of claim 12, wherein the sequencing sequences the plurality of frequency offset values among N-frame blocks based on the sequence numbers in received bursts.

14. The method of claim 11, wherein the calculating the estimated frequency offset includes determining a current sample of the estimated frequency offset based on a current interpolated frequency offset value, a previous sample of the estimated frequency offset, and the exponential averaging coefficient.

15. The method of claim 11, further comprising:
determining a predicted frequency offset based on the estimated frequency offset and a communications delay between a communications hub and a remote communications unit, the predicted frequency offset including a frequency offset predicted for a time period of the communications delay between the communications hub to the remote communications unit.

16. The method of claim 15, further comprising:
synchronizing a carrier frequency source based on the predicted frequency offset.

17. The method of claim 11, wherein the exponential averaging coefficient is determined according to a number of frames of an equivalent moving average window and a number of the plurality of interpolated frequency offset values or number of bursts per frame.

18. The method of claim 17, wherein
the exponential averaging coefficient is determined as $$\alpha = \frac{2}{nfw \cdot nbpf + 1},$$

where $\alpha$ is the exponential averaging coefficient, nfw is the number of frames of the equivalent moving average window, and nbpf is the number of the plurality of interpolated frequency offset values per frame.

19. The method of claim 18, wherein the moving average window size is 4 and the number of the plurality of interpolated frequency offset values per frame is 10.

20. A non-transitory computer readable storage medium storing computer readable instructions thereon that, when executed by an arithmetic processor, direct the arithmetic processor to perform a frequency offset estimation and correction method comprising: averaging, for each of a plurality of frames, a plurality of frequency offset values to obtain a frame offset average for each frame; producing, for each of the plurality of frames, a plurality of interpolated frequency offset values uniformly distributed over a time period of the frame based on the frame offset average of the frame and a frame offset average of at least one previous frame; and calculating the estimated frequency offset based on the plurality of interpolated frequency offset values weighted by an exponential averaging coefficient.

21. A communications system, comprising:
a communications hub including
a receiver to receive a plurality of communications bursts and generate a frequency offset value for each of the bursts, to generate frequency offset values,
a frame averaging unit to average, for each of a plurality of frames, a plurality of the frequency offset values to obtain a frame offset average for each of the plurality of frames,
a re-sampling unit to produce, for each of the plurality of frames, a plurality of interpolated frequency offset values uniformly distributed over a time period of a frame of the plurality of frames based on the frame offset average of the frame and a frame offset average of at least one frame that precedes the frame, and
an exponential averaging unit to calculate an estimated frequency offset based on the plurality of interpolated frequency offset values weighted by an exponential averaging coefficient, and
a transmitter to transmit the estimated frequency offset; and
a remote communications unit including
a receiver to receive the estimated frequency offset and synchronize a carrier frequency source of the remote communications unit based on the received estimated frequency offset.

22. A remote communications unit, comprising:
a receiver to receive an estimated frequency offset; and
a frequency offset correction unit to synchronize a carrier frequency source and apply a predicted timing correction to bursts before transmission of the bursts based on the estimated frequency offset, the estimated frequency offset being determined according to an exponential average of a plurality of interpolated frequency offset values weighted by an exponential averaging coefficient, the plurality of interpolated frequency offset values being uniformly distributed over a time period of a frame based on frame offset averages of frequency offset values of the frames.

* * * * *